(12) United States Patent
Lampe-Onnerud et al.

(10) Patent No.: US 7,656,125 B2
(45) Date of Patent: Feb. 2, 2010

(54) METHOD AND DEVICE FOR CONTROLLING A STORAGE VOLTAGE OF A BATTERY PACK

(75) Inventors: Christina M. Lampe-Onnerud, Framingham, MA (US); Yanning Song, Shrewsbury, MA (US); Richard V Chamberlain, II, Fairfax Station, VA (US); Per Onnerud, Framingham, MA (US)

(73) Assignee: Boston-Power, Inc., Westborough, MA (US)

( * ) Notice: Subject to any disclaimer, the term of this patent is extended or adjusted under 35 U.S.C. 154(b) by 263 days.

(21) Appl. No.: 11/486,970

(22) Filed: Jul. 14, 2006

(65) Prior Publication Data
US 2007/0029972 A1  Feb. 8, 2007

Related U.S. Application Data

(60) Provisional application No. 60/699,088, filed on Jul. 14, 2005.

(51) Int. Cl.
*H02J 7/00* (2006.01)
(52) U.S. Cl. .................. 320/134; 320/133; 320/157; 320/164; 429/322
(58) Field of Classification Search ................ 320/133, 320/134, 136; 429/322
See application file for complete search history.

(56) References Cited

U.S. PATENT DOCUMENTS 4,280,578 A * 7/1981 Perkins .................. 180/6.5
4,553,081 A   11/1985 Koenck 5,254,931 A   10/1993 Martensson
(Continued)

FOREIGN PATENT DOCUMENTS
CN  1700498  11/2005
(Continued)

OTHER PUBLICATIONS

Deng, B., et al., "Greatly improved elevated-temperature cycling behavior of $Li_{1+x}Mg_yMn_{2-x-y}O_{4+\delta}$ spinels with controlled oxygen stiochiometry," *Electrochimica Acta* (49)11:1823-1830 (2004).
(Continued)

*Primary Examiner*—Edward Tso
*Assistant Examiner*—Arun Williams
(74) *Attorney, Agent, or Firm*—Hamilton, Brook, Smith & Reynolds, P.C.

(57) ABSTRACT

A storage voltage of a battery pack is controlled with control electronics. The storage voltage of a battery pack is sensed, and a discharge mechanism is triggered if the storage voltage is within a predetermined range of voltage, to thereby adjust the storage voltage of the battery pack to below the predetermined range of voltage, or if the storage voltage is at or above a predetermined voltage, to thereby adjust the storage voltage of the battery pack to below the predetermined voltage. Control electronics sense a storage voltage of a battery pack and trigger a discharge mechanism if the storage voltage is within a predetermined range of voltage, to thereby adjust the storage voltage of the battery pack to below the predetermined range of voltage, or if the storage voltage is at or above a predetermined voltage, to thereby adjust the storage voltage of the battery pack to below the predetermined voltage. The control electronics are coupled to an electronic device and a battery pack. The control electronics are either implemented into the electronic device or the battery pack, or in a separate control electronic device.

37 Claims, 20 Drawing Sheets

U.S. PATENT DOCUMENTS

| | | | |
|---|---|---|---|
| 5,471,128 A * | 11/1995 | Patino et al. | 320/128 |
| 5,567,539 A | 10/1996 | Takahashi et al. | |
| 5,608,305 A | 3/1997 | Kokuga | |
| 5,617,010 A * | 4/1997 | Higashijima et al. | 320/134 |
| 5,677,083 A | 10/1997 | Tomiyama | |
| 5,683,634 A | 11/1997 | Fujii et al. | |
| 5,789,902 A * | 8/1998 | Abe et al. | 320/134 |
| 5,879,834 A | 3/1999 | Mao | |
| 5,920,180 A | 7/1999 | Kim | |
| 5,993,998 A | 11/1999 | Yasuda | |
| 6,008,627 A * | 12/1999 | Narita | 320/134 |
| 6,033,797 A | 3/2000 | Mao et al. | |
| 6,074,523 A | 6/2000 | Mizobuchi et al. | |
| 6,114,836 A | 9/2000 | Hagiwara et al. | |
| 6,133,709 A | 10/2000 | Puchianu | |
| 6,159,636 A | 12/2000 | Wang et al. | |
| 6,166,522 A | 12/2000 | Patino et al. | |
| 6,265,107 B1 | 7/2001 | Shimizu et al. | |
| 6,267,943 B1 | 7/2001 | Manev et al. | |
| 6,275,497 B1 * | 8/2001 | Varma et al. | 370/431 |
| 6,291,973 B1 | 9/2001 | Lee | |
| 6,333,128 B1 | 12/2001 | Sunagawa et al. | |
| 6,395,426 B1 | 5/2002 | Imachi et al. | |
| 6,462,513 B1 | 10/2002 | Bradus et al. | |
| 6,482,550 B1 | 11/2002 | Imachi et al. | |
| 6,521,379 B2 | 2/2003 | Nishida et al. | |
| 6,534,216 B1 | 3/2003 | Narukawa et al. | |
| 6,551,744 B1 | 4/2003 | Ohzuku et al. | |
| 6,582,854 B1 | 6/2003 | Qi et al. | |
| 6,653,021 B2 | 11/2003 | Kweon et al. | |
| 6,677,080 B2 | 1/2004 | Tanizaki et al. | |
| 6,677,082 B2 | 1/2004 | Thackeray et al. | |
| 6,682,850 B1 | 1/2004 | Numata et al. | |
| 6,746,800 B1 | 6/2004 | Sunagawa et al. | |
| 6,808,848 B2 | 10/2004 | Nakanishi et al. | |
| 6,818,351 B2 | 11/2004 | Sunagawa et al. | |
| 7,014,954 B2 | 3/2006 | Yamaguchi et al. | |
| 7,034,506 B2 * | 4/2006 | Chen et al. | 320/136 |
| 7,138,207 B2 | 11/2006 | Yamaguchi et al. | |
| 7,198,871 B2 | 4/2007 | Kitao et al. | |
| 7,258,948 B2 | 8/2007 | Miyamoto et al. | |
| 7,309,546 B2 | 12/2007 | Kweon et al. | |
| 7,338,734 B2 | 3/2008 | Chiang et al. | |
| 7,402,360 B2 | 7/2008 | Imachi et al. | |
| 2001/0020927 A1 | 9/2001 | Ikawa et al. | |
| 2001/0026147 A1 * | 10/2001 | Nakashimo | 320/134 |
| 2002/0001745 A1 | 1/2002 | Gartstein et al. | |
| 2002/0004169 A1 | 1/2002 | Yamada et al. | |
| 2002/0012841 A1 | 1/2002 | Kurose et al. | |
| 2002/0061443 A1 | 5/2002 | Nakanishi et al. | |
| 2002/0089308 A1 * | 7/2002 | Sakurai | 320/134 |
| 2002/0189831 A1 * | 12/2002 | Carrier | 173/217 |
| 2003/0054251 A1 | 3/2003 | Ohzuku et al. | |
| 2003/0073002 A1 | 4/2003 | Imachi et al. | |
| 2003/0087154 A1 | 5/2003 | Ohzuku et al. | |
| 2003/0138699 A1 | 7/2003 | Kweon et al. | |
| 2003/0148183 A1 | 8/2003 | Yamasaki | |
| 2003/0170540 A1 | 9/2003 | Ohzuku et al. | |
| 2003/0180615 A1 | 9/2003 | Johnson et al. | |
| 2003/0180616 A1 | 9/2003 | Johnson et al. | |
| 2004/0058243 A1 | 3/2004 | Ohzuku et al. | |
| 2004/0081888 A1 | 4/2004 | Thackeray et al. | |
| 2004/0096743 A1 | 5/2004 | Okae et al. | |
| 2004/0126660 A1 | 7/2004 | Ohzuku et al. | |
| 2004/0197650 A1 | 10/2004 | Kubota et al. | |
| 2004/0197654 A1 | 10/2004 | Barker et al. | |
| 2004/0202933 A1 * | 10/2004 | Yamaki et al. | 429/231.1 |
| 2005/0026040 A1 | 2/2005 | Thackeray et al. | |
| 2005/0079416 A1 | 4/2005 | Ohzuku et al. | |
| 2005/0142442 A1 | 6/2005 | Yuasa et al. | |
| 2005/0147889 A1 | 7/2005 | Ohzuku et al. | |
| 2005/0170250 A1 | 8/2005 | Ohzuku et al. | |
| 2005/0186474 A1 | 8/2005 | Jiang et al. | |
| 2006/0035151 A1 | 2/2006 | Kumeuchi et al. | |
| 2006/0063073 A1 * | 3/2006 | Kawashima et al. | 429/246 |
| 2006/0222936 A1 | 10/2006 | Yamaguchi et al. | |
| 2007/0082265 A1 | 4/2007 | Itou et al. | |
| 2007/0111098 A1 * | 5/2007 | Yang Kook et al. | 429/231.95 |

FOREIGN PATENT DOCUMENTS

| | | |
|---|---|---|
| EP | 0 762 521 A2 | 3/1997 |
| EP | 0 762 521 A3 | 5/1997 |
| EP | 0 949 702 A1 | 10/1999 |
| EP | 0 973 217 A2 | 1/2000 |
| EP | 0 997 957 A1 | 5/2000 |
| EP | 0 999 604 A1 | 5/2000 |
| EP | 1 022 792 A1 | 7/2000 |
| EP | 1 100 133 A2 | 5/2001 |
| EP | 0 997 957 B1 | 8/2001 |
| EP | 1 237 213 A2 | 9/2002 |
| EP | 1 296 391 A1 | 3/2003 |
| EP | 1 309 022 A2 | 5/2003 |
| EP | 1 309 022 A3 | 5/2003 |
| EP | 0 949 702 B1 | 8/2003 |
| EP | 1 383 183 A1 | 1/2004 |
| EP | 1 487 039 A1 | 12/2004 |
| EP | 1 538 686 A1 | 6/2005 |
| EP | 1 237 213 A3 | 11/2005 |
| JP | 5082131 | 4/1993 |
| JP | 2000-012030 | 1/2000 |
| JP | 2001-195353 A | 7/2001 |
| JP | 2001-243943 A | 9/2001 |
| JP | 2001-319647 | 11/2001 |
| JP | 2001328818 | 11/2001 |
| JP | 2002-042815 | 2/2002 |
| JP | 2002-075369 A | 3/2002 |
| JP | 2002216745 | 8/2002 |
| JP | 2002251996 | 9/2002 |
| JP | 2003-197180 | 7/2003 |
| JP | 2004-006094 A | 1/2004 |
| WO | WO 93/19508 A1 | 9/1993 |
| WO | WO 98/24131 A | 6/1998 |
| WO | WO 99/53556 | 10/1999 |
| WO | WO 02/078105 A1 | 10/2002 |
| WO | WO 03/026047 A1 | 3/2003 |
| WO | WO 03/075376 A1 | 9/2003 |
| WO | WO 03/092099 A1 | 11/2003 |
| WO | WO 2004/019433 A1 | 3/2004 |
| WO | WO 2004/097964 A2 | 11/2004 |
| WO | WO 2004/097964 A3 | 11/2004 |
| WO | WO 2004/105162 A1 | 12/2004 |
| WO | WO 2005/031892 A2 | 4/2005 |
| WO | WO 2006/071972 A2 | 7/2006 |
| WO | WO 2006/071972 A3 | 7/2006 |

OTHER PUBLICATIONS

Ohzuku, T., et al., "Electrochemistry of Manganese Dioxide in Lithium Nonaqueous Cell," *J. Electrochemical Society*, (137)3:769-775 (Mar. 1, 1990).

Cho, J., et al., "Zero-Strain Intercalation Cathode for Rechargeable Li-Ion Cell," *Angew.Chem. Int. Ed.* (40)18:3367-3369 (2001) (Month not available).

* cited by examiner

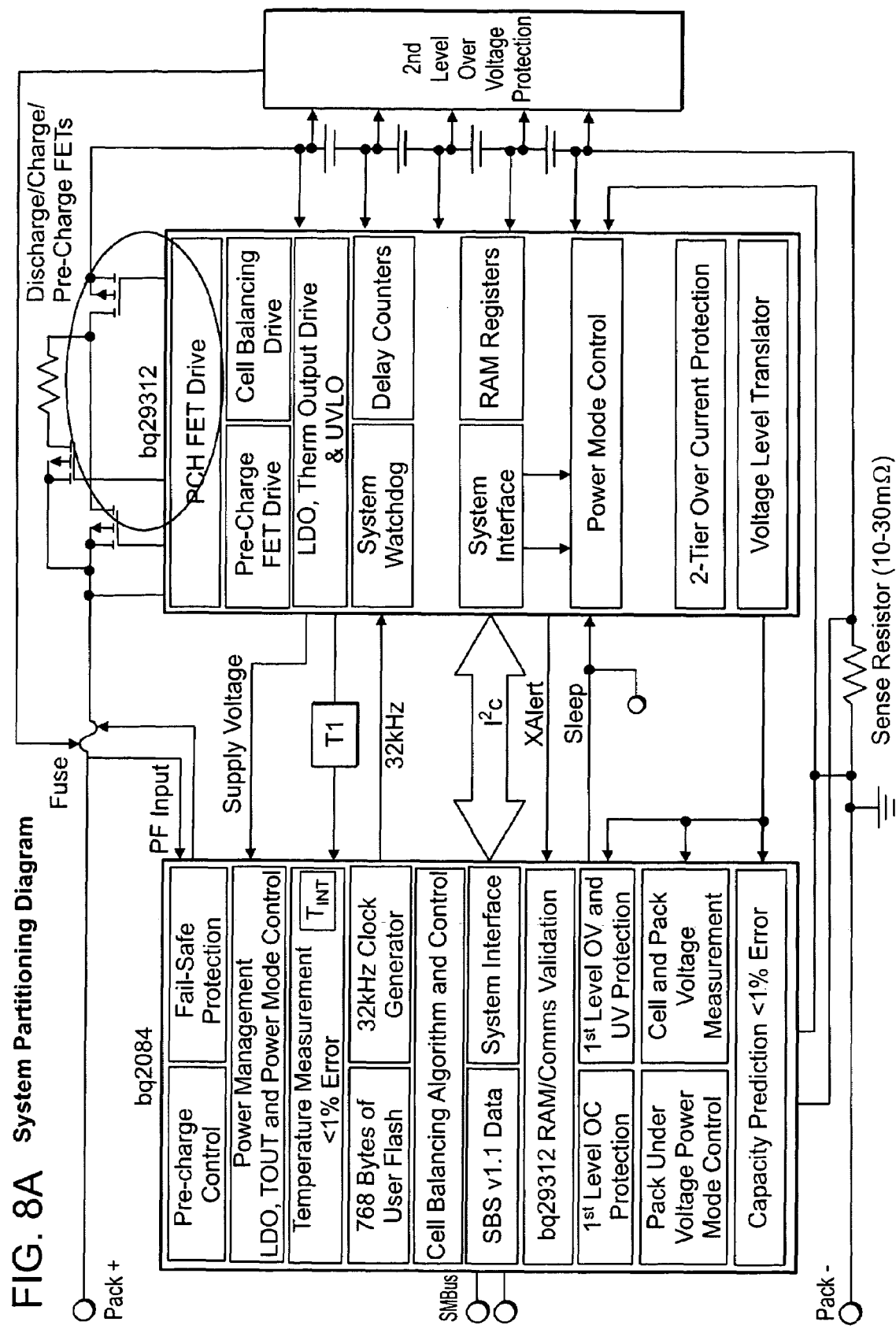
FIG. 8A System Partitioning Diagram

METHOD AND DEVICE FOR CONTROLLING A STORAGE VOLTAGE OF A BATTERY PACK

RELATED APPLICATION

This application claims the benefit of U.S. Provisional Application No. 60/699,088, filed on Jul. 14, 2005, the entire teachings of which are incorporated herein by reference.

BACKGROUND OF THE INVENTION

Li-ion batteries in portable electronic devices typically undergo different charging, discharging and storage routines based on their users. Although it would be advantageous to have relatively long calendar (or storage) life and/or cycle life of the batteries, typically the batteries have limited calendar and cycle lives partly due to chemical degradation of the battery and mechanical degradation caused by the breathing nature of electrodes, changing their thickness upon lithium intercalation and removal. For example, although Li-ion batteries employing a manganate-spinel-based cathode material generally have higher safety, higher power capability and lower manufacturing cost, compared to those employing a $LiCoO_2$-based cathode material, they have relatively lower cycle and calendar lives. Also, among the same type of batteries, their calendar and cycle lives can be different from each other depending upon charging, discharging and storage routines that they undergo based on their users.

Two properties generally are to be considered for the calendar life of a battery. The first property relates to lost capacity of a battery during storage via self discharging. It is well known in the battery industry that a battery that is stored without ability to charge may partially lose its charge. The level of charge loss generally depends on factors such as chemical stability, temperature and storage time. Li-ion batteries are examples of such batteries that generally lose their capacity during storage via self discharging. The lost capacity of a Li-ion battery may be measured as the relative state-of-charge change (or voltage change) that a battery undergoes during storage. The second property relates to recoverable capacity and permanent degradation of a battery that is non-recoverable. The recoverable capacity can be measured by relating initial capacity during a full charge/discharge cycle to that of a full charge/discharge cycle of a battery that has been stored. The lost capacity of a battery is believed to be related to chemical degradation of the battery during storage, which is different from the degradation caused by cycling a battery. The degradation caused by cycling a battery is believed to include degradation caused by the breathing nature of electrodes. Regardless, degradation of batteries consequent to prolonged periods of use is a pervasive problem for many electronic devices, particularly those that employ lithium-ion batteries.

Therefore, there is a need for developing methods for increasing the calendar life and/or cycle life of batteries, such as Li-ion batteries.

SUMMARY OF THE INVENTION

The invention generally relates to methods and electronic devices that control a storage voltage of a battery or battery pack to adjust its storage voltage to avoid a detrimental voltage range or a detrimental voltage, thereby minimizing the time the battery or battery pack spends at the detrimental voltage range or the detrimental voltage.

Applicants have now discovered that for Li-ion batteries, and in particular for Li-ion batteries containing a mixture of a lithium cobaltate and a manganate spinel, the storage voltage level of a given battery (or cell) is a determining factor for the calendar life of the battery. Applicants have now also discovered that there is a particular storage voltage range where Li-ion batteries degrade faster. Based upon these discoveries, a method of controlling a storage voltage of a battery pack with control electronics; a system comprising an electronic device, a battery pack and control electronics coupled to the electronic device and the battery pack; a battery pack comprising a pack housing, at least one cell in the pack housing and control electronics in the pack housing; and a control electronic device comprising control electronics are disclosed herein.

In one embodiment, the present invention is directed to a method of controlling a storage voltage of a battery pack with control electronics. The method includes the steps of sensing a storage voltage of the battery pack and triggering a discharge mechanism if the storage voltage is within a predetermined range of voltage, to thereby adjust the storage voltage of the battery pack to below the predetermined range of voltage, or if the storage voltage is at or above a predetermined voltage, to thereby adjust the storage voltage of the battery pack to below the predetermined voltage. Preferably, the control electronics and the battery pack are coupled to an electronic device.

In another embodiment, the present invention is directed to a system comprising an electronic device, a battery pack and control electronics coupled to the electronic device and the battery pack. The control electronics sense a storage voltage of the battery pack and trigger a discharge mechanism if the storage voltage is within a predetermined range of voltage, to thereby adjust the storage voltage of the battery pack to below the predetermined range of voltage, or if the storage voltage is at or above a predetermined voltage, to thereby adjust the storage voltage of the battery pack to below the predetermined voltage.

In yet another embodiment, the present invention is directed to a battery pack comprising a pack housing, at least one cell in the pack housing and control electronics in the pack housing to sense a storage voltage of the battery pack and to trigger a discharge mechanism if the storage voltage is within a predetermined range of voltage, to thereby adjust the storage voltage of the battery pack to below the predetermined range of voltage, or if the storage voltage is at or above a predetermined voltage, to thereby adjust the storage voltage of the battery pack to below the predetermined voltage.

The present invention also includes a control electronic device that includes a device housing and control electronics in the device housing to sense a storage voltage of a battery pack and to trigger a discharge mechanism if the storage voltage is within a predetermined range of voltage, to thereby adjust the storage voltage of the battery pack to below the predetermined range of voltage, or if the storage voltage is at or above a predetermined voltage, to thereby adjust the storage voltage of the battery pack to below the predetermined voltage.

The present invention can enhance calendar life and/or cycle life in batteries effectively. Typically, Li-ion batteries in portable electronic devices undergo different charging, discharging and storage routines based on their users. For example, some users use their devices on a daily basis starting with a fully charged battery in the morning and at the end of the day they plug their device into the charger in order to again fully charge the battery. Other users may keep their fully-charged device plugged to an external power, in which the battery is at a full state-of-charge, and then may occasionally unplug the device, draining the battery. Power drain can also vary greatly between users. In addition, a battery may undergo storage at any given state-of-charge for periods of a few hours to several days, or in some cases even weeks or months. With the present invention, a voltage of such batteries while they are not actively being used, i.e., a storage voltage of the batteries, can be controlled to avoid a predetermined range of voltage which can be detrimental for calendar life of the batteries and thereby enhance the calendar life of the batteries. The present invention is particularly useful for HEV applications that has a requirement of long calendar life, as well as for long lived portable devices.

BRIEF DESCRIPTION OF THE DRAWINGS

FIG. 8A is a schematic representation of an example of battery charging chipset supporting cell balancing from Texas Instruments, which can be used for an electronic circuit for controlling a storage voltage of a battery pack in the invention.

DETAILED DESCRIPTION OF THE INVENTION

Figure 1:
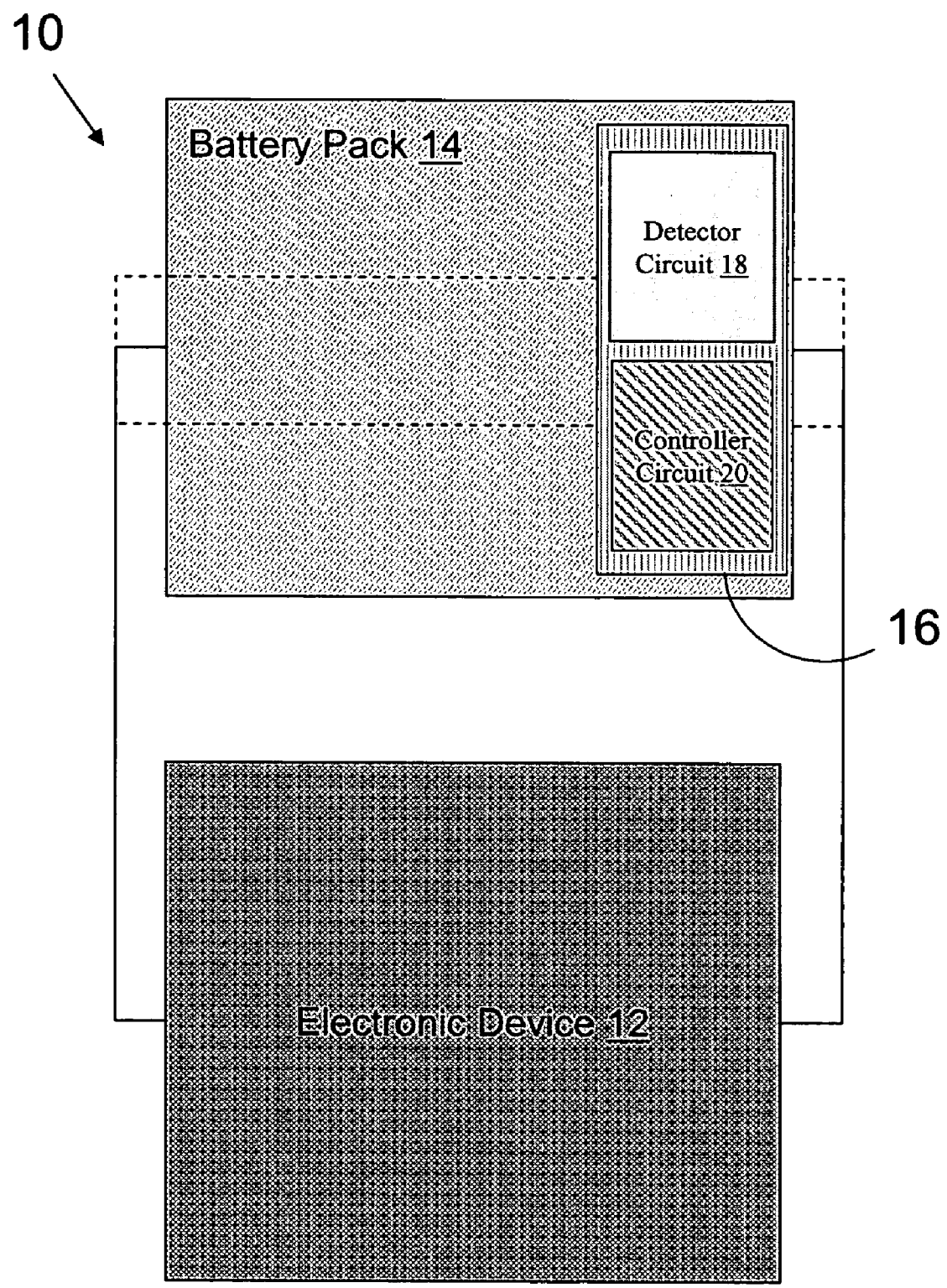
FIG. 1 is a schematic representation of an embodiment of the present invention, showing a system of the invention that includes an electronic device, a battery pack and control electronics coupled to the electronic device, where the control electronics are implemented in the batter pack.

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

As used herein, the term "storage voltage" means an essentially constant voltage of a battery pack or battery where the change of the voltage over time is equal to or less than about 0.05 V per day. Thus, any voltage change of the storage voltage over time is caused by self discharging, but not by drainage due to running an electronic device. For example, the battery pack or battery is at a storage voltage when the battery pack or battery is not being used actively for a substantial time period, such as at least about 30 minutes, at least about 1 hour, or at least about 2 hours. Such cases can be found where the electronic device coupled to the battery pack or battery is turned off, or where the electronic device coupled to the battery pack is not interacting with a user for a substantial time period (e.g., at least about 30 minutes, at least about 1 hour, or at least about 2 hours), or where an external power supply is being used for the electronic device, resulting in a voltage of the battery pack or battery being kept at a substantially constant voltage, for example at a full state-of-charge (e.g., 4.2 V) for a substantial time period (e.g., at least about 30 minutes, at least about 1 hour, or at least about 2 hours).

As used herein, the term "battery pack or battery at a full state-of-charge" means a battery pack or battery is at its maximum voltage, e.g., 4.2 V per block of series cells, a block being one or more cells in parallel.

FIG. 1 shows system 10 of the invention, which includes electronic device 12, battery pack (or battery) 14 and control electronics 16 coupled to electronic device 12 and battery pack 14. In this embodiment, control electronics 16 is implemented or incorporated into battery pack 14.

Control electronics 16 typically sense a storage voltage of battery pack 14 and trigger a discharge mechanism if the storage voltage is within a predetermined range(s) of voltage (e.g., between about 3.85 V and about 3.95 V and/or between about 4.15 V and about 4.20 V) to thereby adjust the storage voltage to below the predetermined range of voltage, or if the storage voltage is at or above a predetermined voltage, such as a full state-of charge (e.g., 4.2 V), to thereby adjust the storage voltage to below the predetermined voltage. Preferably, this triggered discharge mechanism occurs when a predetermined amount of time has passed.

In the invention, more than one predetermined range and/or more than one predetermined voltage can be employed. In one embodiment, there is more than one predetermined range of voltage that each triggers the discharging mechanism. In another embodiment, there is more than one predetermined range of voltage that each triggers the discharging mechanism, and there is one or more predetermined voltages that each trigger the discharging mechanism.

The discharging can be done by any suitable methods known in the art, for example, through a resistive load until the storage voltage becomes lower than the predetermined range of voltage or the predetermined voltage. The termination of the discharging can be done by sensing a voltage of battery pack 14 during the discharging, and the discharging terminates when the voltage reaches a voltage value that is below the predetermined range of voltage or the predetermined voltage. Preferably, the voltage value at which the discharging terminates is not lower than about 3.0 V per cell.

More preferably, the voltage value for each individual cell or parallel block of cells at which the discharging terminates is in a range of between about 3.75 V and about 3.85 V, such as about 3.8 V, or between about 3.95 V and about 4.15 V, such as about 4.1 V. Generally, a suitable rate of the discharging is in a range of between about 10 mA and about 50 mA.

As shown in FIG. 1, in a preferred embodiment, control electronics 16 includes detector circuit 18 to sense a voltage of battery pack 14 and a voltage change over time, and controller circuit 20 to control a voltage of battery pack 14.

Detector circuit 18 preferably includes a voltage sensor and a time sensor, or a combined voltage- and time-sensor. With such sensor(s), control electronics 16 can sense periodically time ($t_i$) and a voltage ($V_{i,j}$) of cell(s) j of battery pack 14 at time $t_i$. Control circuit 20 preferably includes a voltage sensor and a current sensor, or a combined voltage- and current-sensor. With such sensor(s), control circuit 20 can discharge battery pack 14 to thereby adjust a voltage ($V_{i,j}$) of cell(s) j of battery pack 14 below the predetermined range of voltage or the predetermined voltage.

The electronic device can be on or off when the discharge mechanism is triggered. Further, the electronic device can be actively used, utlizing an external power source, at the time that the discharging mechanism is triggered. Alternatively, the electronic device can be on, or activated, but idle (i.e., not being actively used at the time the discharge mechanism triggered). Similarly, the discharge mechanism can be triggered while the electronic device is shut off, regardless of whether the device is connected to an external power source.

In a specific embodiment, detector circuit 18 senses a time period for which electronic device 12 is not interacting with a user, and determines if the time period is longer than a predetermined value, and if the storage voltage is within a predetermined range of voltage, or at or above a predetermined voltage at any time during that time period, detector circuit 18 triggers control circuit 20 to initiate the discharge mechanism. Preferably, the predetermined time value is about 30 minutes, preferably 1 hour, more preferably about 2 hours.

In another specific embodiment, detector circuit 18 senses if battery pack 14 is in a charge mode, and senses a time period for the charging. In a more specific embodiment, detector circuit 18 also senses if the voltage of battery pack 14 is at or above a predetermined value. If the time period of charging is longer than a predetermined value, and if the voltage of battery pack 14 is at or above the predetermined value, detector circuit 18 triggers control circuit 20 to initiate the discharge mechanism to thereby adjust the voltage to below the predetermined voltage. The discharging mechanism can be operated by turning off charging and initiating discharging. Preferably, the predetermined time value is about 30 minutes, preferably 1 hour, more preferably about 2 hours.

In yet another specific embodiment, detector circuit 18 determines if the storage voltage of battery pack 14 is kept at a full state-of-charge for longer than a predetermined time value, such as for longer than about 30 minutes, preferably for longer than 1 hour, more preferably for longer than about 2 hours. This indicates that electronic device 12 is being operated by an external power source, rendering battery pack 14 not being used and keeping battery pack 14 at its full state-of-charge. Since keeping a battery at its full state-of-charge for a long period may reduce the cycle life and safety of the battery, it is advantageous to avoid such situation. If it is determined that the storage voltage of battery pack 14 is kept at a full state-of-charge for longer than a predetermined time value, detector circuit 18 triggers control circuit 20 to initiate the discharge mechanism. Preferably, the predetermined time value is about 30 minutes, preferably about 1 hour, more preferably about 2 hours.

Figure 2:
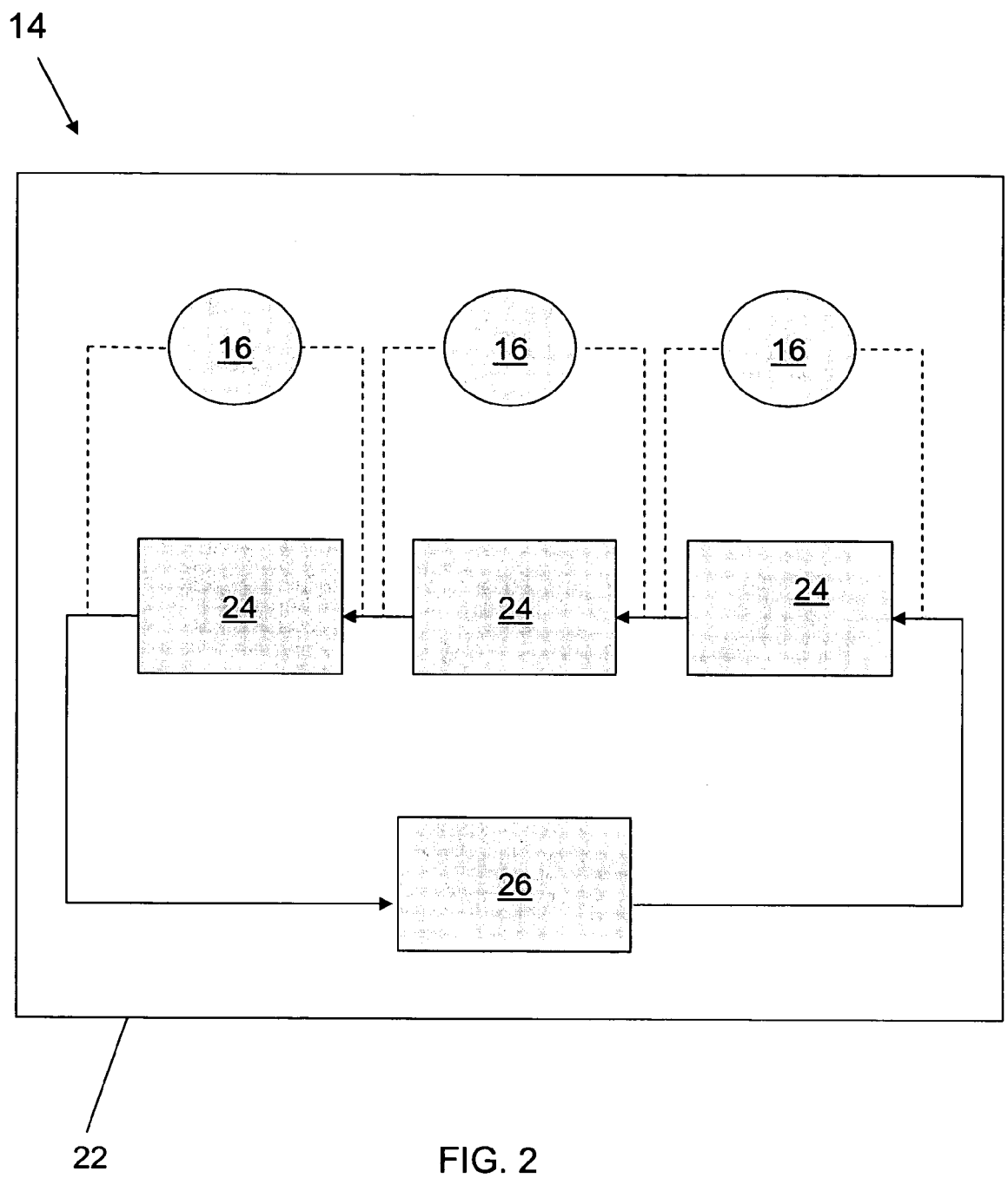
FIG. 2 is a schematic representation of a battery pack of the invention including control electronics that control a storage voltage of the battery pack.

Referring back to FIG. 1, in the embodiment of FIG. 1, control electronics 16 is implemented or incorporated into battery pack 14. A specific example of such a battery pack of the invention is shown in FIG. 2. As shown in FIG. 2, battery pack 14 includes pack housing 22 and one or more cells 24 in pack housing 22. One or more control electronics 16 are in communication with cells 24. Battery pack 14 can additionally include charger 26 to charge/recharge cells 24. Preferably, the charger 26 is coupled with control electronics 16.

Figure 3:
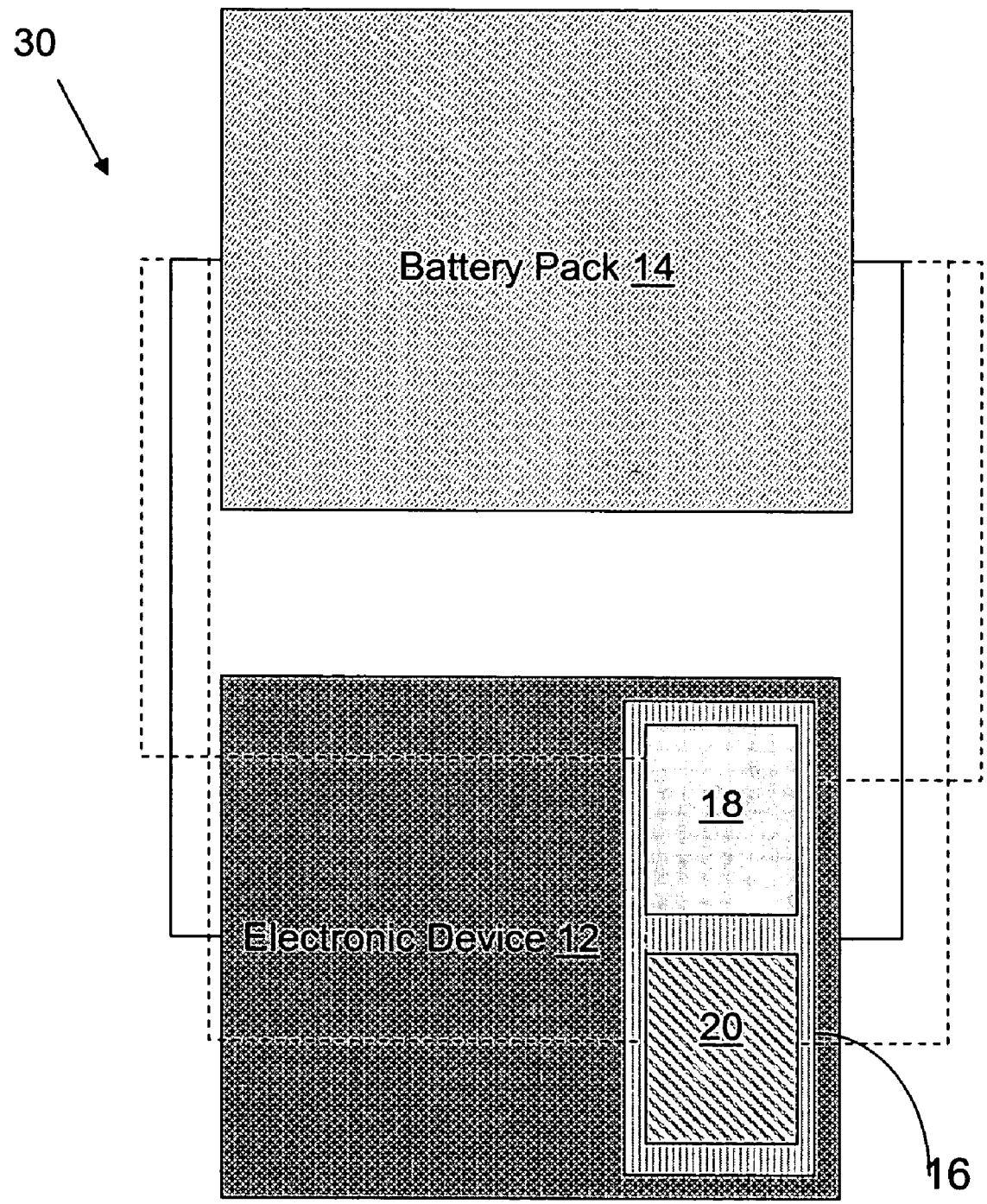
FIG. 3 is a schematic representation of an embodiment of the present invention, showing a system of the invention that includes an electronic device, a battery pack and control electronics coupled to the electronic device, where the control electronics are implemented in the electronic device.
Figure 4:
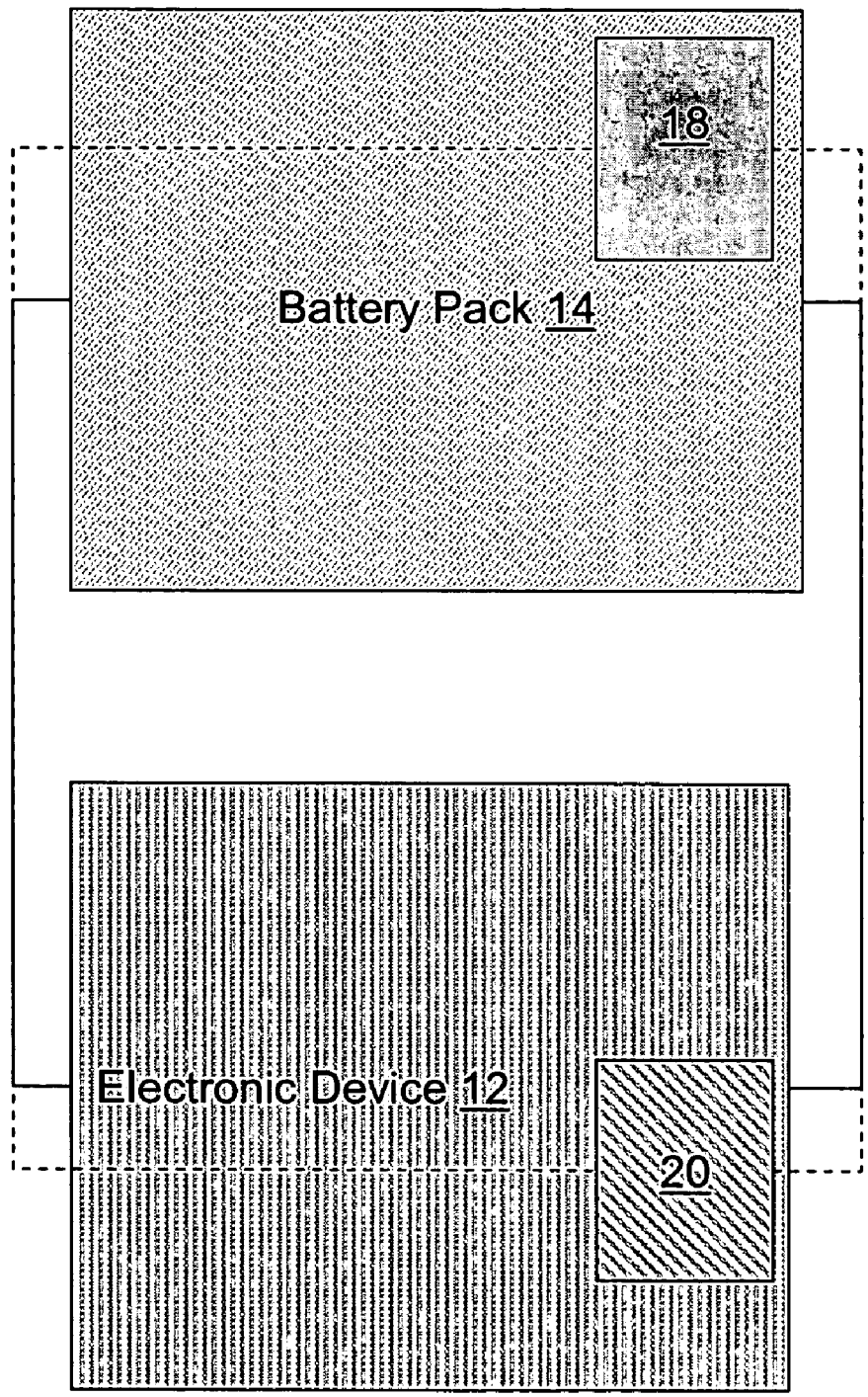
FIG. 4 is a schematic representation of an embodiment of the present invention, showing a system of the invention that includes an electronic device, a battery pack and control electronics coupled to the electronic device, where a component of the control electronics is included in the batter pack and a component of the control electronics is implemented in the electronic device.
Figure 5:
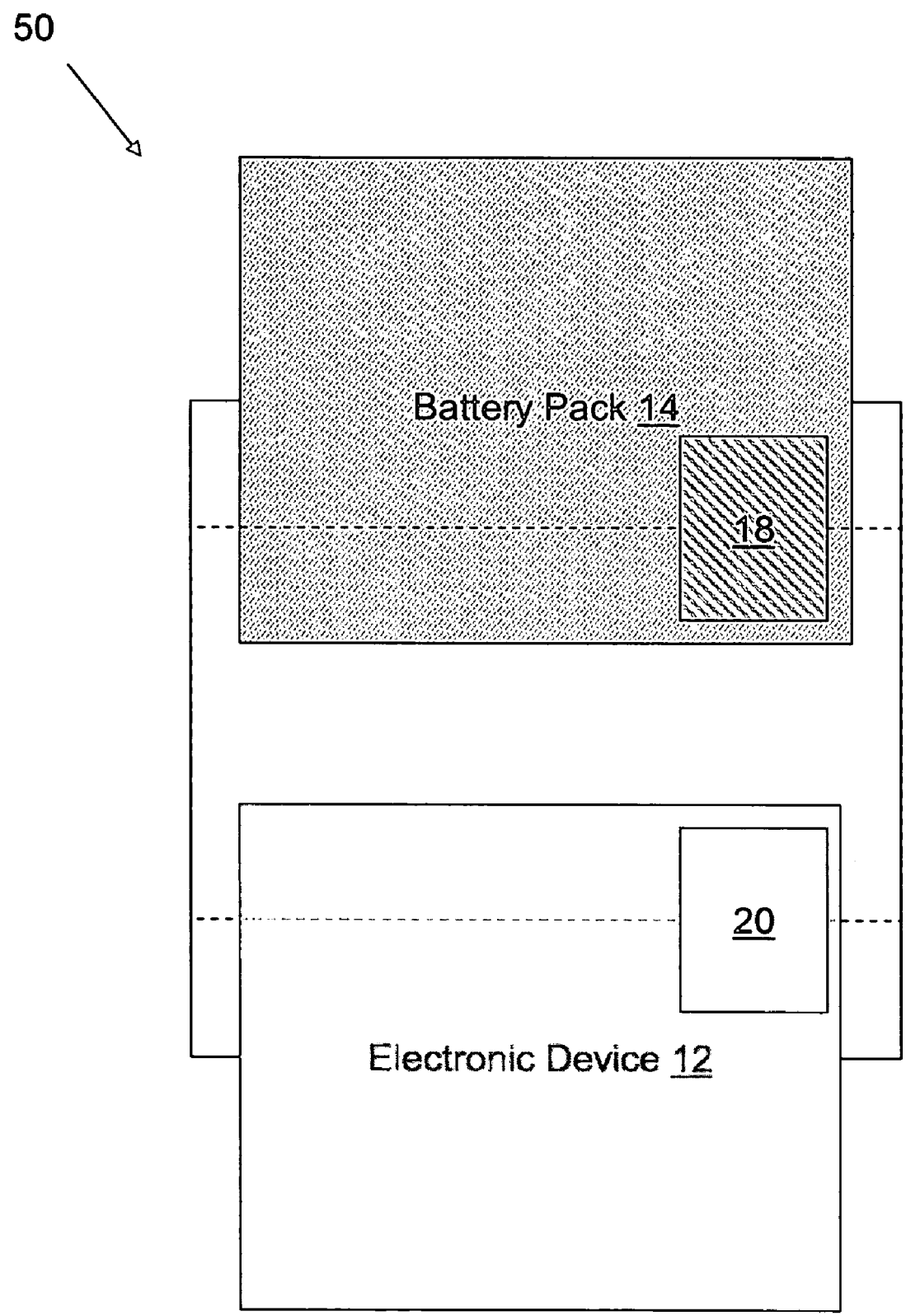
FIG. 5 is a schematic representation of another embodiment of the present invention, showing a system of the invention that includes an electronic device, a battery pack and control electronics coupled to the electronic device, where a component of the control electronics is included in the batter pack and a component of the control electronics is implemented in the electronic device.

Alternatively, control electronics 16 can be implemented or incorporated into electronic device 12, as shown in FIG. 3. FIGS. 4 and 5 show other embodiments where a component of control electronics 16 is implemented or incorporated into battery pack 14 and a component of control electronics 16 is implemented or incorporated into electronic device 12. Specifically, FIG. 4 shows system 40 of the invention where detector circuit 18 is implemented or incorporated into battery pack 14, and controller circuit 20 is implemented or incorporated into electronic device 12. FIG. 5 shows system 50 of the invention where detector circuit 18 is implemented or incorporated into electronic device 12, and controller circuit 20 is implemented or incorporated into battery pack 14.

Figure 6:
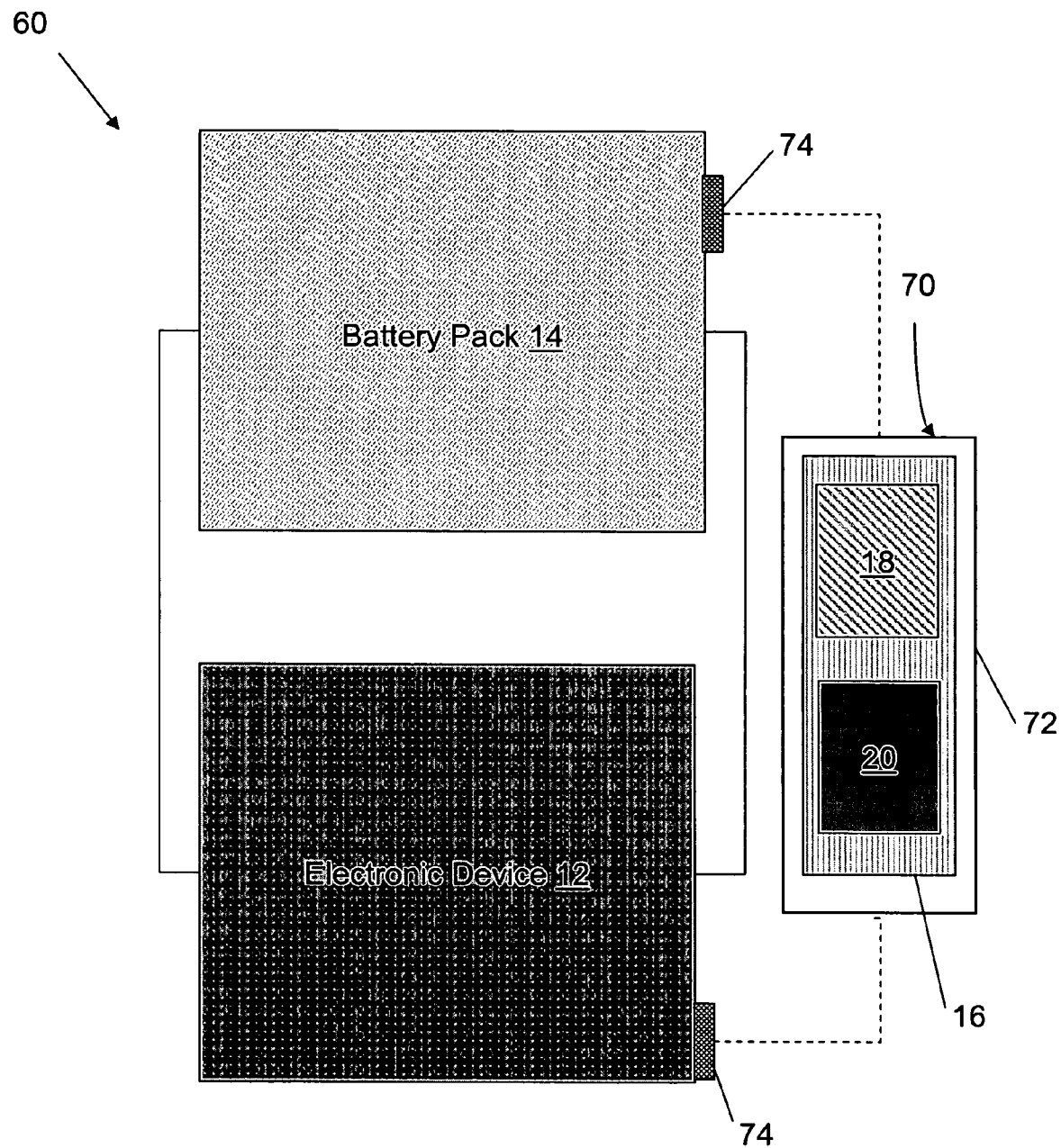
FIG. 6 is a schematic representation of an embodiment of the present invention, showing a system of the invention that includes an electronic device, a battery pack and control electronics coupled to the electronic device, where the control electronics are implemented in a control electronic device separate from the battery pack and from the electronic device.

In yet other embodiments, as shown in FIG. 6, control electronics 16 are implemented or incorporated into separate control electronic device 70 that includes device housing 72 and control electronics 16 in device housing 72.

When control electronics 16 are implemented or incorporated into either electronic device 12 or battery pack 14, control electronics 16 can optionally be executed in a microprocessor located inside electronic device 12 or battery pack 14. As shown in FIG. 6, when control electronics 16 are implemented or incorporated into separate control electronic device 70, control electronics 16 can communicate with electronic device 12, such as a laptop computer, and with battery pack 14, through serial communication ports 74 known in the art, for example, serial communication ports SMBC/SMBD.

Figure 7A:
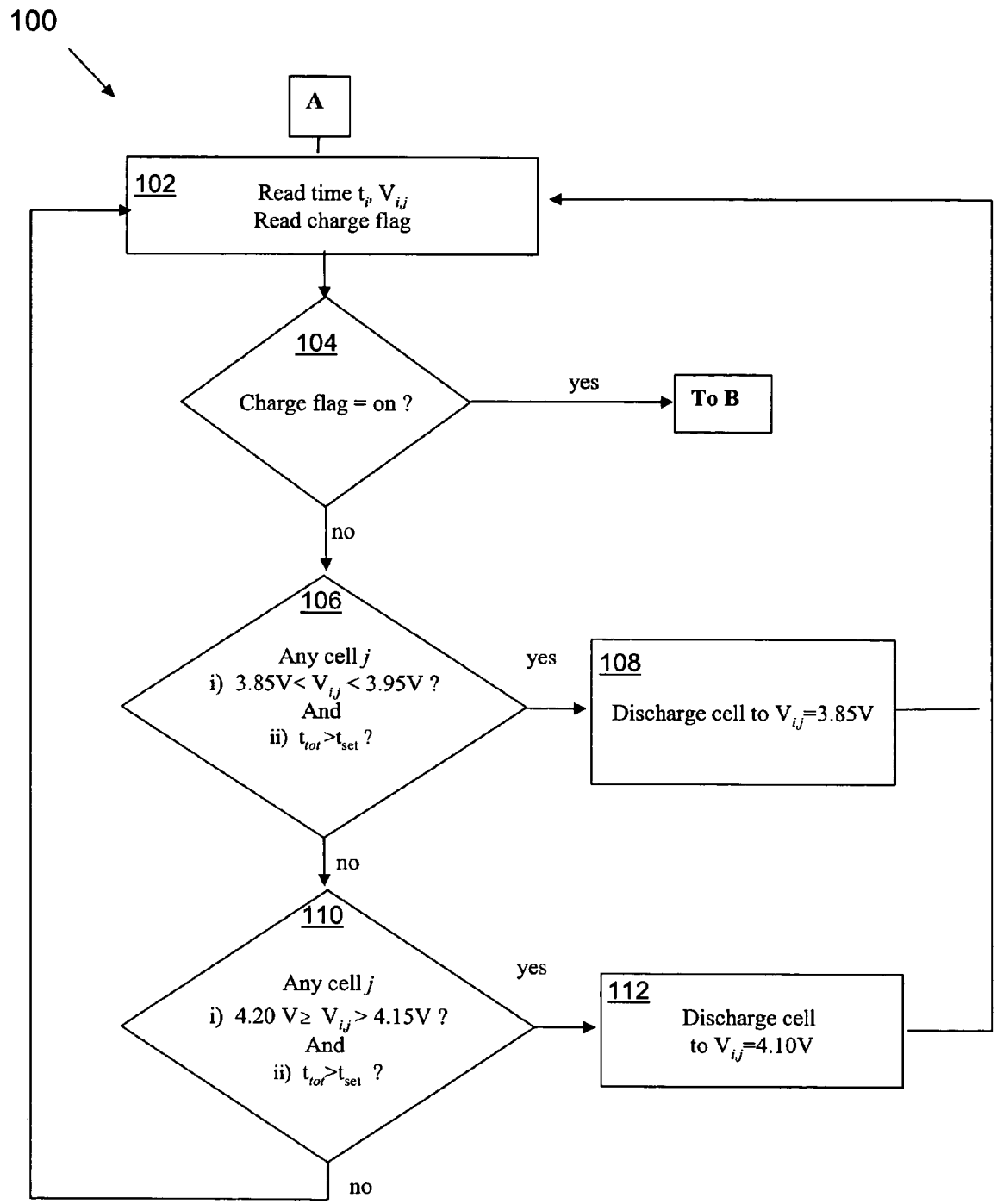
FIGS. 7A and 7B are schematic representations of one embodiment of method steps for the control electronics of the invention.
Figure 7B:
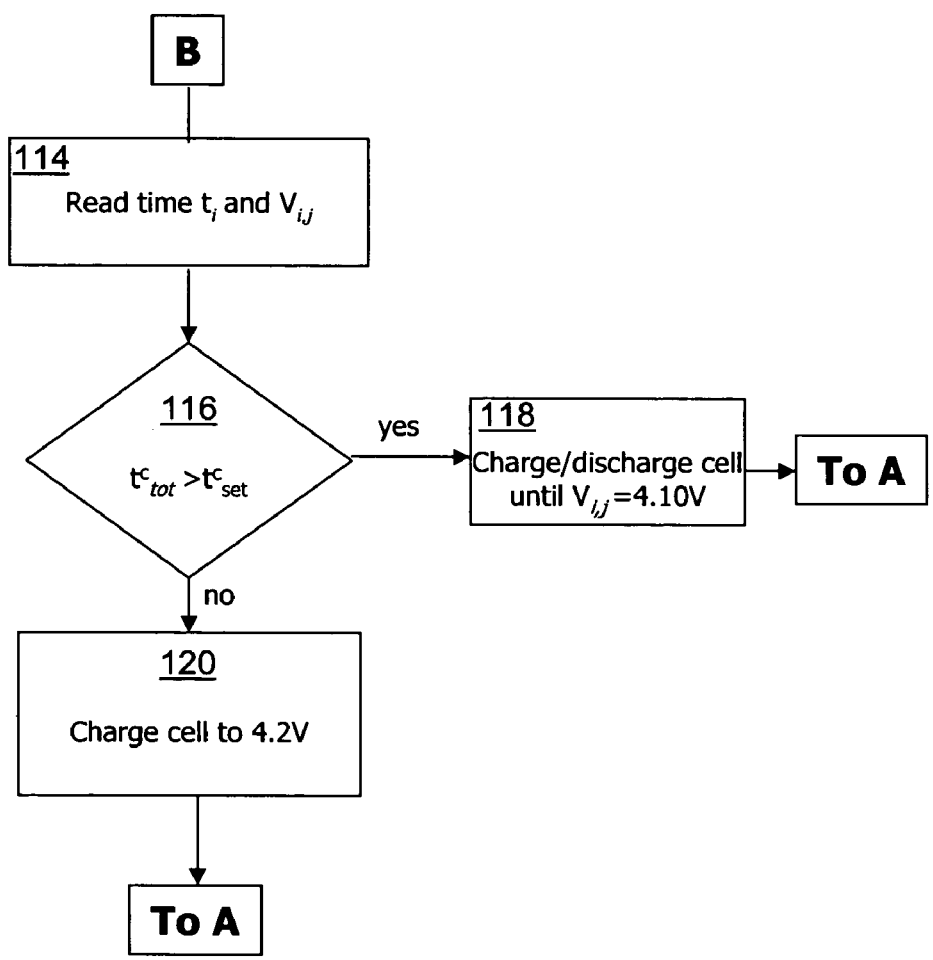
Figure 7C:
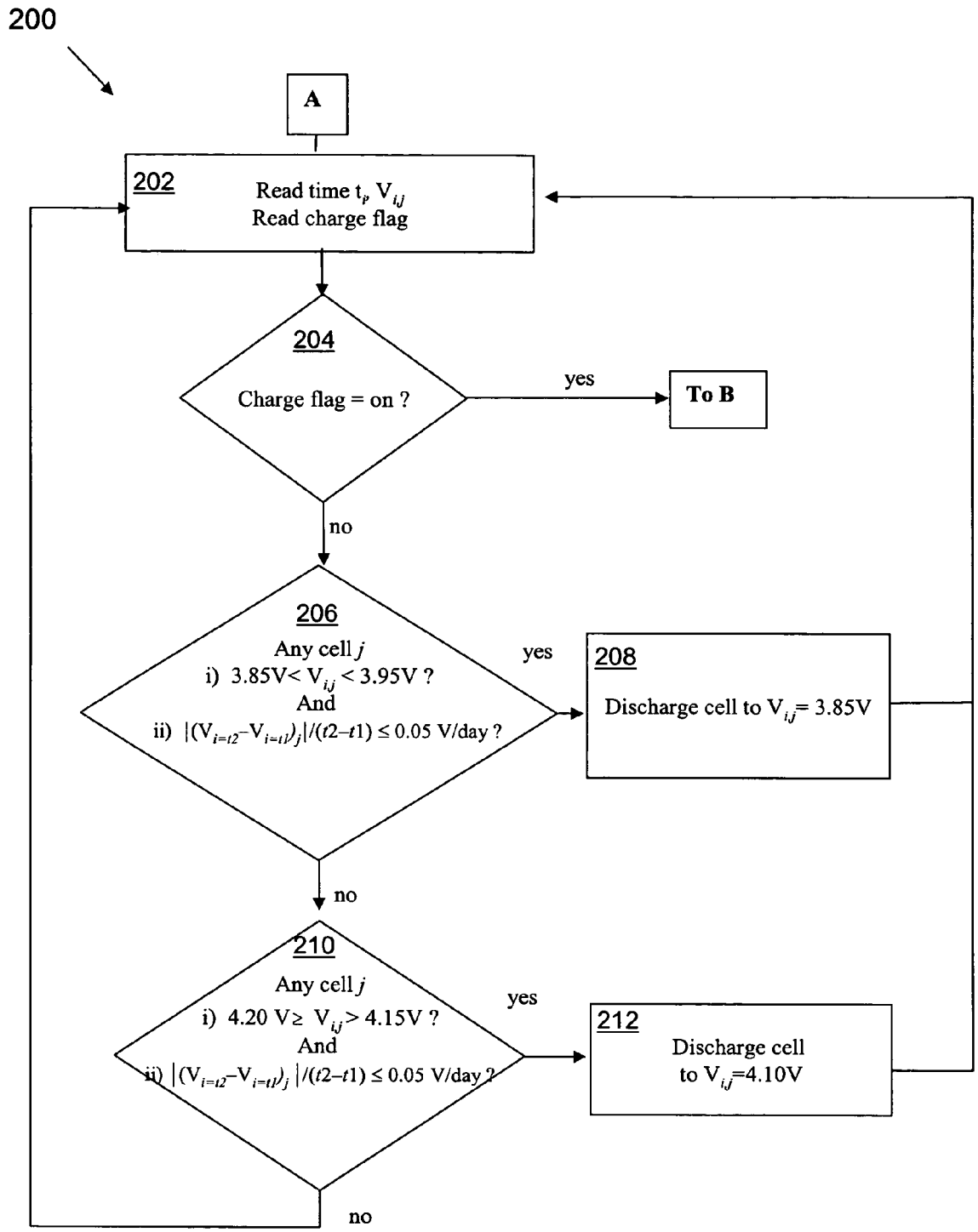
FIGS. 7C and 7D are schematic representations of another embodiment of method steps for the control electronics of the invention.
Figure 7D:
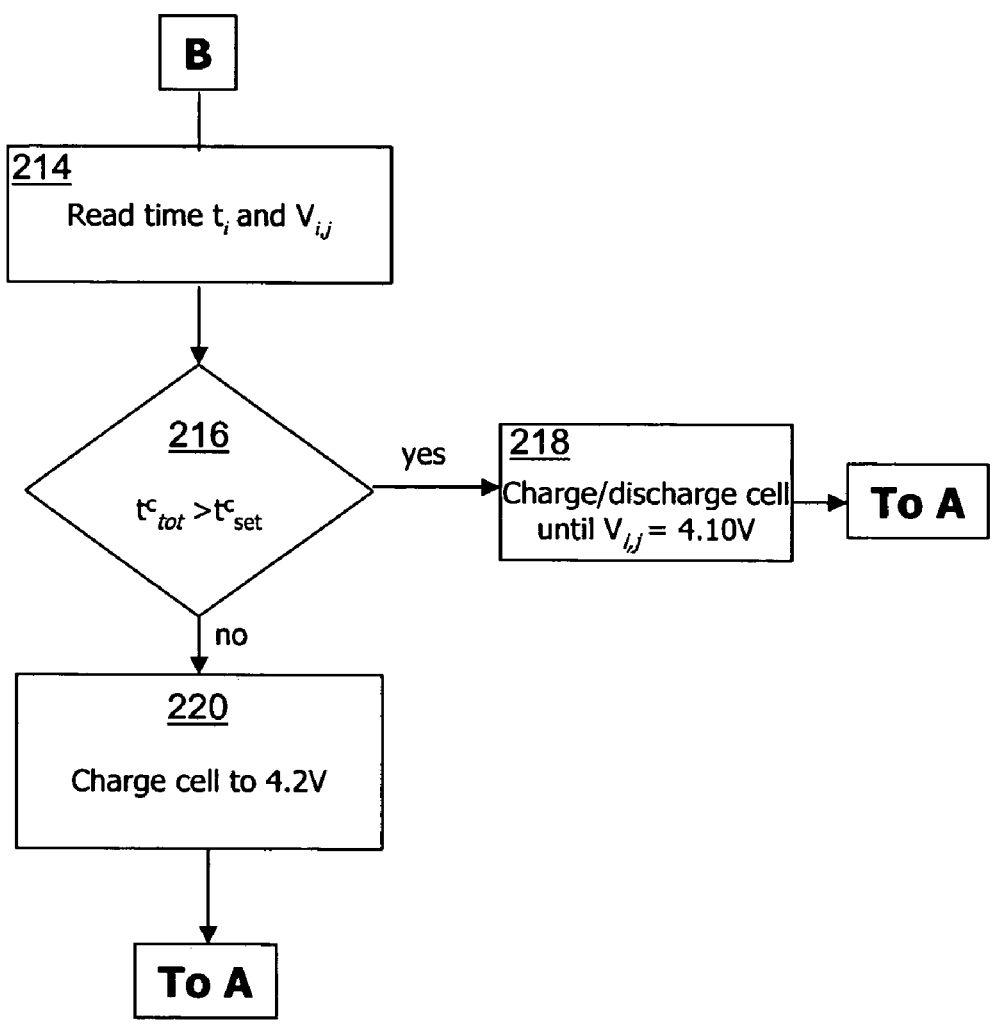

FIGS. 7A and 7B show flow charts of one embodiment of the invention for controlling a storage voltage of battery pack 14 with control electronics 16 that are coupled to battery pack 14 and electronic device 12. FIGS. 7C and 7D show flow charts of another embodiment of the invention for controlling a storage voltage of battery pack 14 with control electronics 16 that are coupled to battery pack 14 and electronic device 12.

As shown in FIGS. 7A and 7C, in step 102 or step 202, control electronics 16 read time $t_i$, voltage $V_{i,j}$ of individual cells, or of block of cells of battery pack 14 (cell(s) j) at time $t_i$, and optionally a status of charging mode (referred to "charge flag" in FIGS. 7A and 7C) of battery pack 14. For example, the charge flag is on when battery pack 14 is in charge mode, and the charge flag is off when the battery pack is being used as a power source for electronic device 12.

If the charge flag is not on, control electronics 16, e.g., detector circuit 18 of control electronics 16, read $V_{i,j}$ of any cell or of block of cells of battery pack 14 (cell(s) j). In one embodiment, as shown in step 106 of FIG. 7A, control electronics 16 determine i) if $V_{i,j}$ is within a predetermined range, i.e., between about 3.85 V and about 3.95 V, and also determine ii) if total time $t_{tot}$ (i.e., t2−t1) for which $V_{i,j}$ is within the predetermined range is greater than a predetermined time value $t_{set}$, which can be set, for example, between about 1 and 2 hours. Alternatively, as shown in step 206 of FIG. 7C, control electronics 16 determine i) if $V_{i,j}$ is within a predetermined range, i.e., between about 3.85 V and about 3.95 V, and also determine ii) if any voltage change over time ($|(V_{i=t2}-V_{i=t1})_j|/t2-t1$) is less than or equal to about 0.05 V/day, preferably less than or equal to about 0.03 V/day, more preferably less than or equal to about 0.01 V/day. If both conditions i) and ii) of step 106 or step 206 are met, detector circuit 18 of control electronics 16 triggers control circuit 20 of control electronics to initiate discharging the cell(s) j until $V_{i,j}$ becomes, for example, 3.85 V (step 108 of FIG. 7A, step 208 of FIG. 7C).

In yet another alternative embodiment of step 206 (not shown), when the voltage change over time ($|(V_{i=t2}-V_{i=t1})_j|/t2-t1$) is determined less than or equal to about 0.05 V/day, preferably less than or equal to about 0.03 V/day, more preferably less than or equal to about 0.01 V/day, discharging may be triggered only if total time $t_{tot}$ (i.e., t2-t1) for which $V_{i,j}$ is within the predetermined range is also greater than a predetermined time value $t_{set}$.

In step 106, if $V_i$ is not within a predetermined range, i.e., between about 3.85 V and about 3.95 V, or even if $V_i$ is within the predetermined range, but the total time $t_{tot}$ for which $V_i$ is within the predetermined range is not greater than a predetermined time value $t_{set}$, control electronics 16 moves on step 110. Similarly, in step 206, even if $V_{i,j}$ is within the predetermined range, but if any voltage change over time ($|(V_{i=t2}-V_{i=t1})_j|/t2-t1$) is not less than or equal to about 0.05 V/day, such as not less than or equal to about 0.03 V/day, or not less than or equal to about 0.01 V/day, control electronics 16 moves on step 110.

As shown in step 110 of FIG. 7A, control electronics 16, e.g., detector circuit 18 of control electronics 16, determines i) if $V_{i,j}$ is within a second predetermined range, i.e., between about 4.15 V and about 4.20 V, and also determines ii) if total time $t_{tot}$ for which $V_{i,j}$ is within the predetermined range is greater than a predetermined time value $t_{set}$. Alternatively, as shown in step 210 of FIG. 7C, control electronics 16, e.g., detector circuit 18 of control electronics 16, determine i) if $V_{i,j}$ is within a second predetermined range, i.e., between about 4.15 V and about 4.20 V, and also determine ii) if any voltage change over time ($|(V_{i=t2}-V_{i=t1})_j|/t2-t1$) is less than or equal to about 0.05 V/day, preferably less than or equal to about 0.03 V/day, more preferably less than or equal to about 0.01 V/day. In step 110 or 210, when these i) and ii) conditions are met, detector circuit 18 of control electronics 16 triggers control circuit 20 of control electronics to initiate discharging the cell(s) j until $V_{i,j}$ is below 4,15 V, for example, 4.10 V (steps 110 and 112 of FIG. 7A, steps 210 and 212 of FIG. 7C).

In yet another alternative embodiment of step 210 (not shown), when the voltage change over time ($|(V_{i=t2}-V_{i=t1})_j|/t2-t1$) is determined less than or equal to about 0.05 V/day, preferably less than or equal to about 0.03 V/day, more preferably less than or equal to about 0.01 V/day, discharging may be triggered only if total time $t_{tot}$ (i.e., t2-t1) for which $V_{i,j}$ is within the predetermined range is also greater than a predetermined time value $t_{set}$.

When the conditions i) and ii) of step 110 are not met, control electronics 16 moves on step 102. Similarly, when the conditions i) and ii) of step 210 are not met, control electronics 16 moves on step 202.

In each of step 104 of FIG. 7A and step 204 of FIG. 7C, if the charge flag is on, control electronics follows scenario B shown in FIG. 7B or FIG. 7D. Under scenario B, detector circuit 18 of control electronics 16 reads time $t_i$ and voltage $V_{i,j}$ of individual cells, or of block of cells of battery pack 14 (cell(s) j) that is under charging mode, and determine whether or not total charging time $t^c_{tot}$ is greater than a predetermined charging time value $t^c_{set}$ (step 116 of FIG. 7B, step 216 of FIG. 7D). If total charging time $t^c_{tot}$ is greater than a predetermined charging time value $t^c_{set}$, detector circuit 18 of control electronics 16 triggers control circuit 20 of control electronics 16 to initiate discharging the cell(s) j until $V_{i,j}$ becomes 4.10 V (step 118 of FIG. 7B, step 218 of FIG. 7D). In the alternative, detector circuit 18 of control electronics 16 triggers a charger (e.g., charger 26 in FIG. 2) that is coupled to control electronics 16 to charge the cell(s) j until $V_{i,j}$ becomes 4.10 V. If total charging time $t^c_{tot}$ is not greater than a predetermined charging time value $t^c_{set}$, charging the cell(s) j continued until $V_{i,j}$ becomes a maximum voltage, for example, 4.20 V (step 120 of FIG. 7B, step 220 of FIG. 7D). Once $V_{i,j}$ either fully charged (step 120 of FIG. 7B, step 220 of FIG. 7D) or charged to $V_i$=4.10 V (step 118 of FIG. 7B, step 218 of FIG. 7D), control electronics 16 resume scenario A shown in FIG. 7A or FIG. 7C.

Charging the cell(s) j can be done by any suitable method known in the art, for example, by charger 26 as shown in FIG. 2. Typical charging currents for batteries are in a range of between about 0.7 C and about 1 C. Such a charging current is allowed until a maximum voltage ($V_{max}$) is reached, e.g., 4.2 V. Once $V_{max}$ has been reached, the charging current is lowered by control charging circuitry to disallow any of the cells of battery pack 14 to reach a voltage level higher than 4.2 V. Electronic circuits managing this type of functionality are known in the art, for example, in a U.S. Provisional Application Ser. No. 60/816,977 entitled "Special Function Battery Pack B," filed on Jun. 28, 2006, the entire teachings of which are incorporated herein by reference). Optionally, a fast charge process employing a relatively high charging current, as described in the U.S. Provisional Application entitled "Special Function Battery Pack B" can be implemented into charger 26 of battery pack.

The predetermined time values $t_{set}$ in steps 106 and 110 and $t^c_{set}$, in step 116 can be each independently different or the same. Examples of $t_{set}$ and $t^c_{set}$ include any time values in a range of between about 30 minutes and about 2 hours, such as between about 40 minutes and about 2 hours or between about 1 hour and about 2 hours.

Any suitable electronic circuits known in the art can be used in the invention, and appropriately programmed with parameters suitable for the desired applications of control electronics 16 of the invention, for example as implemented in systems 10, 30, 40, 50 and 60 of the invention. Each battery manufactured generally has an unique chemistry and interpretation of how the battery can be used in best mode to provide long cycle life, long storage life, high capacity and high safety.

One of the parameters that can be controlled by the circuitry is the predetermined range(s) of voltage. Other parameters that can be controlled by the circuitry include voltage change over time due to self discharging; predetermined time value for charging; predetermined time value for which the storage voltage of battery pack 14 is kept at a full state-of-charge; voltage of the full state-of-charge; predetermined time value for which electronic device 12 is not interacting with a user; discharging rate; and voltage level(s) for termination of the discharging. These parameters generally depend upon specific types of cell(s) of battery pack 14.

Figure 8B:
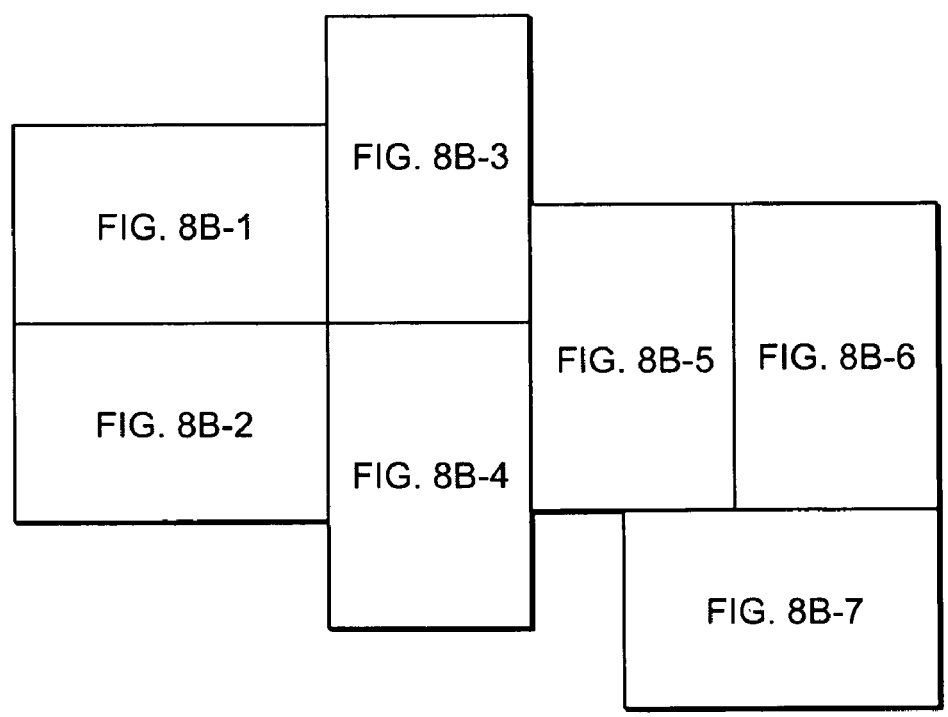
FIG. 8B is a schematic representation of another example of battery charging chipset supporting cell balancing from Texas Instruments, which can be used for an electronic circuit for controlling a storage voltage of a battery pack in the invention (external discharge resistors are circled).
Figures 1, 8B:
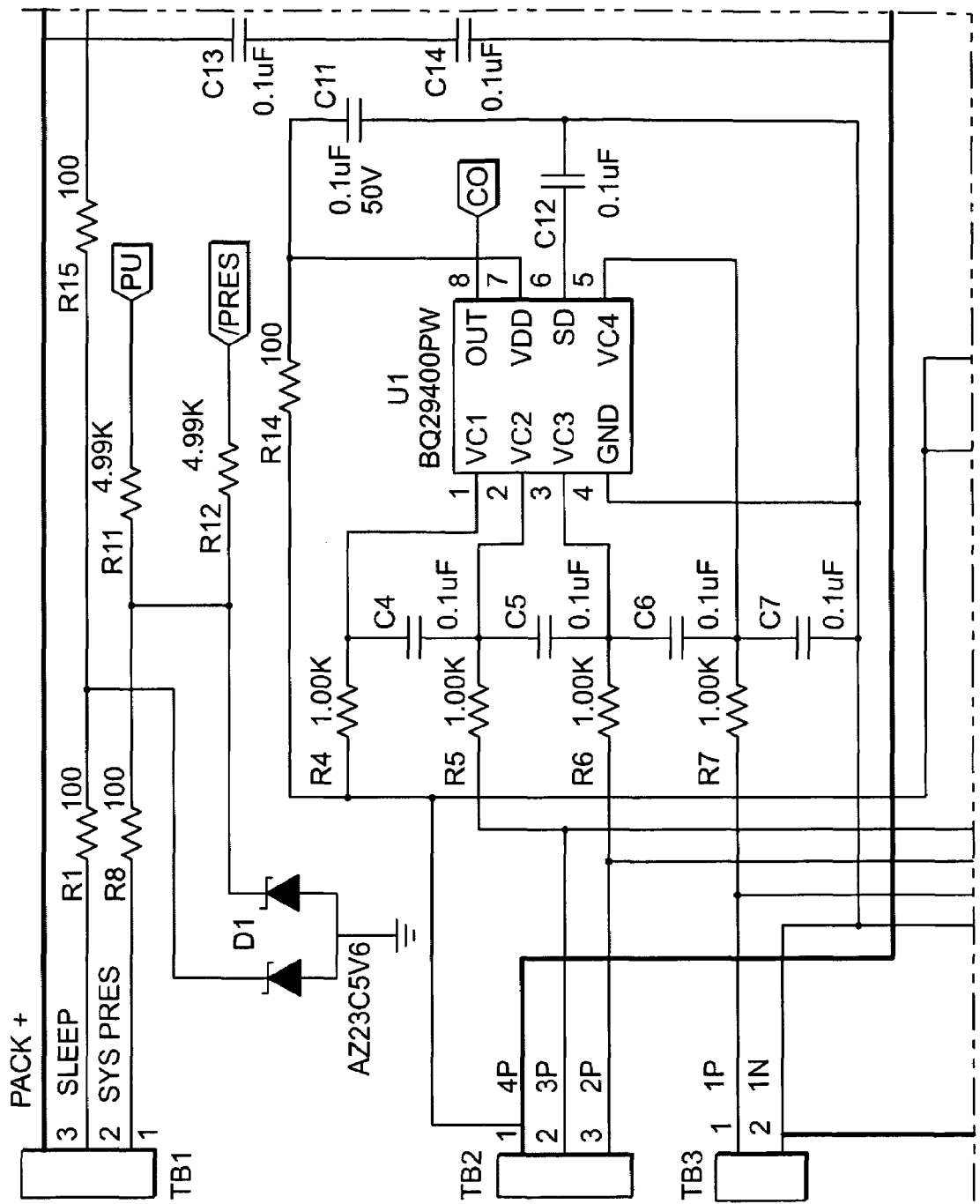
Figures 2, 8B:
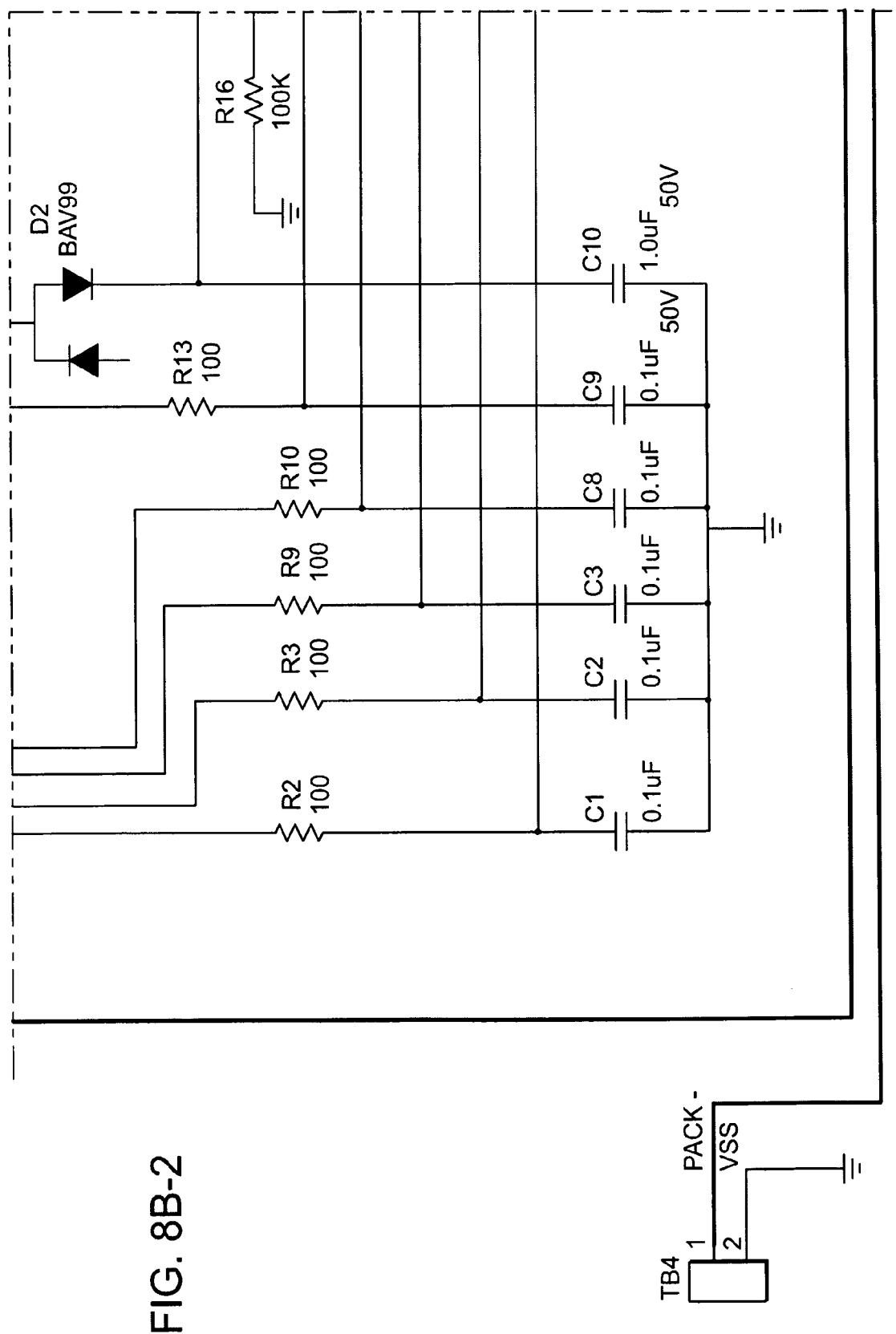
Figures 3, 8B:
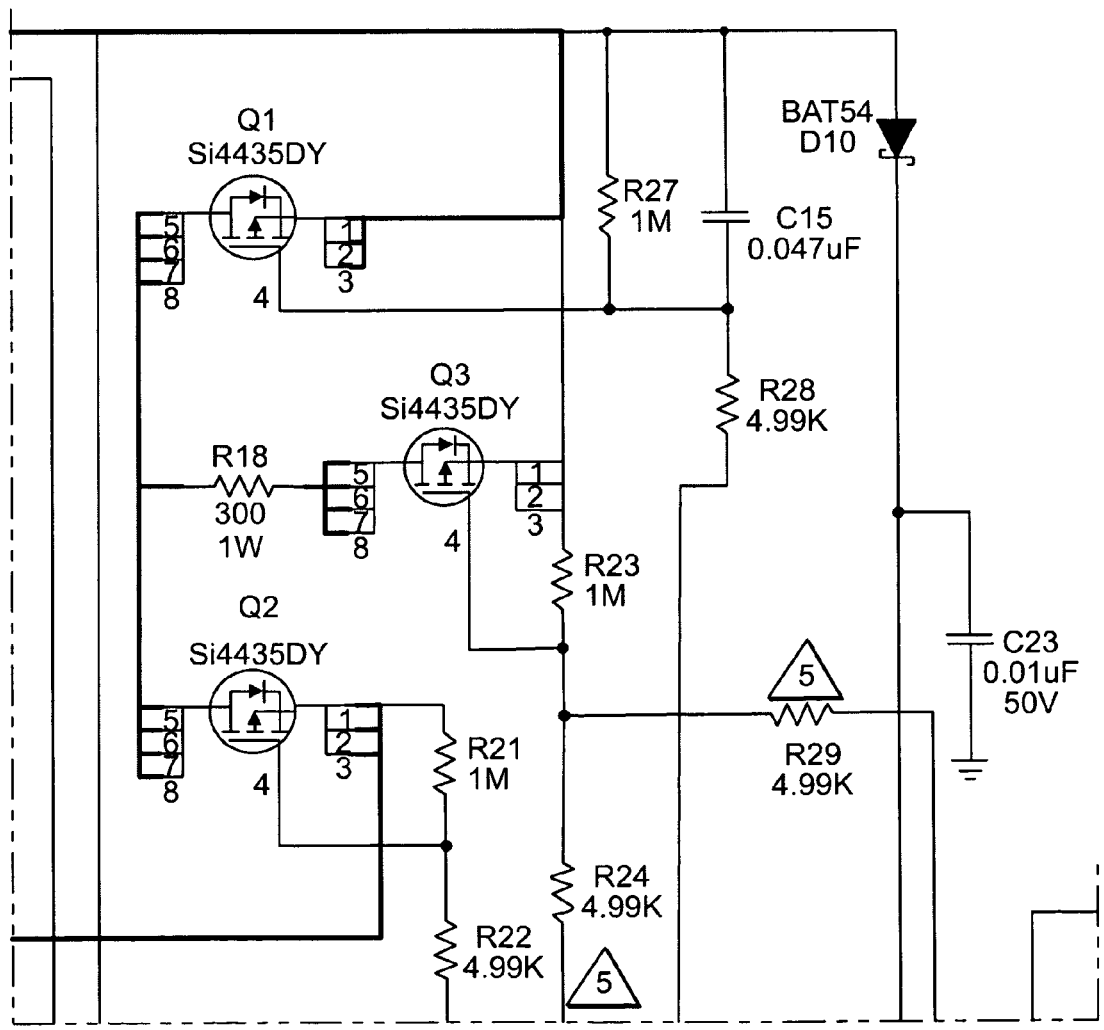
Figures 4, 8B:
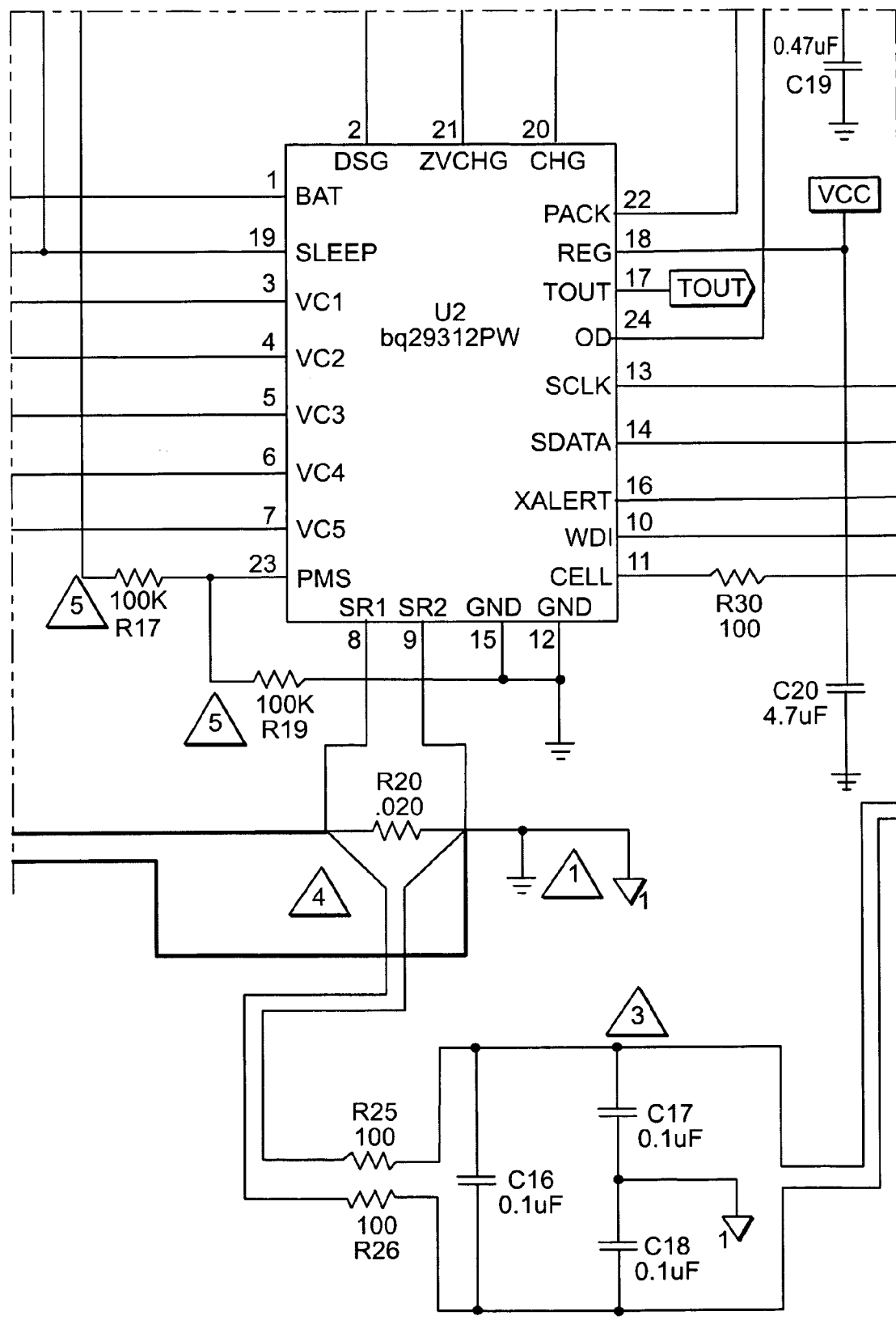
Figures 5, 8B:
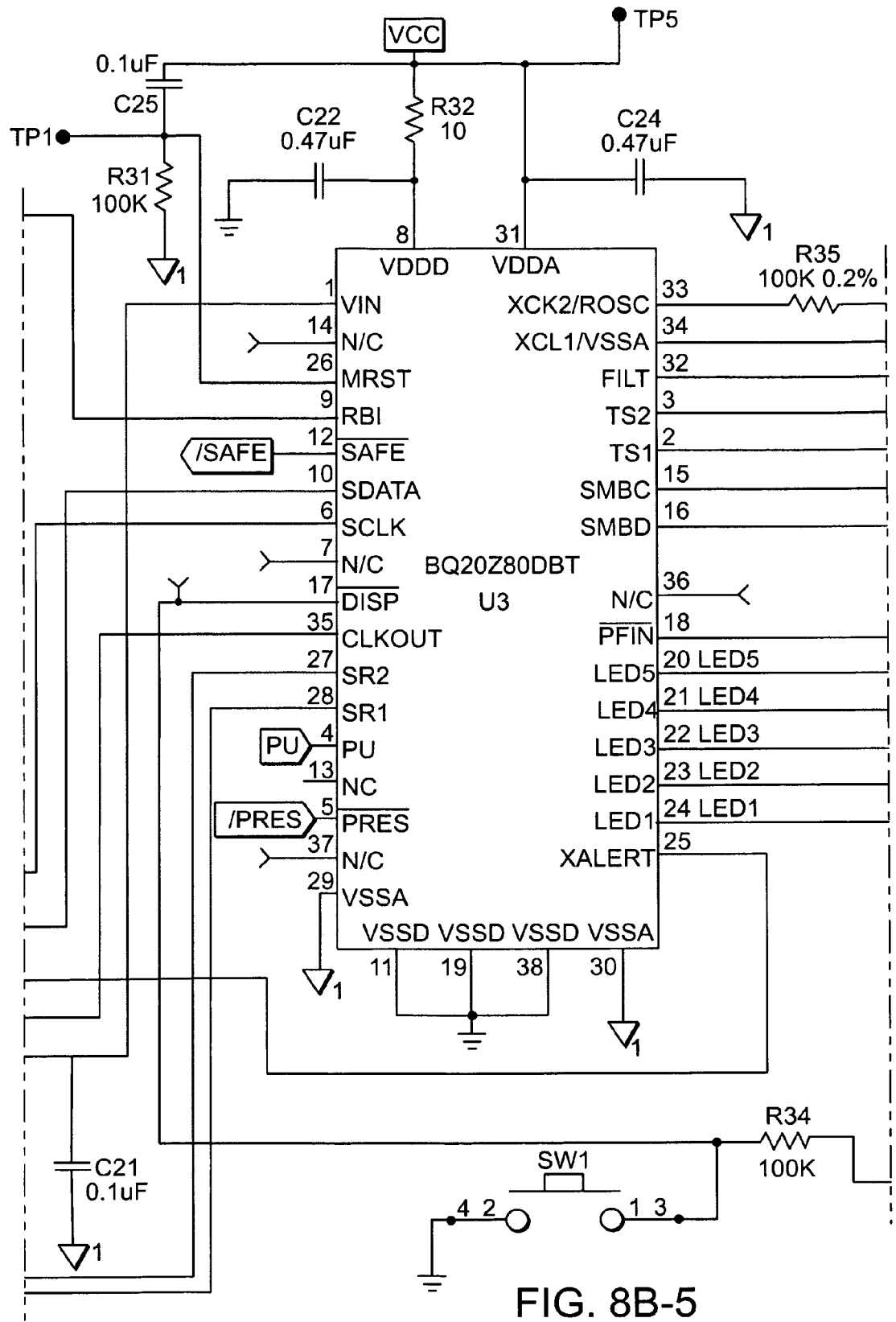
Figures 6, 8B:
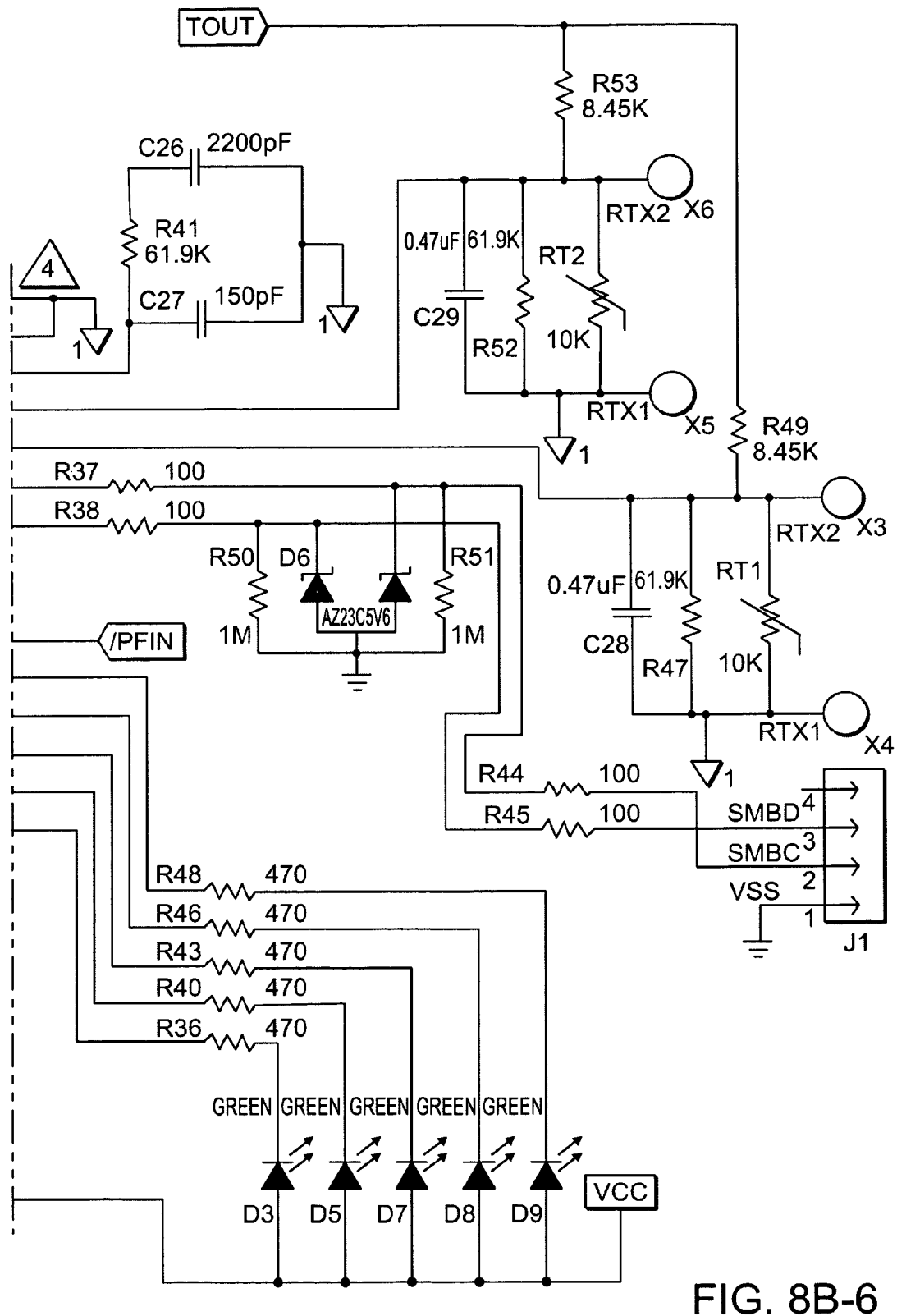
Figures 7, 8B:
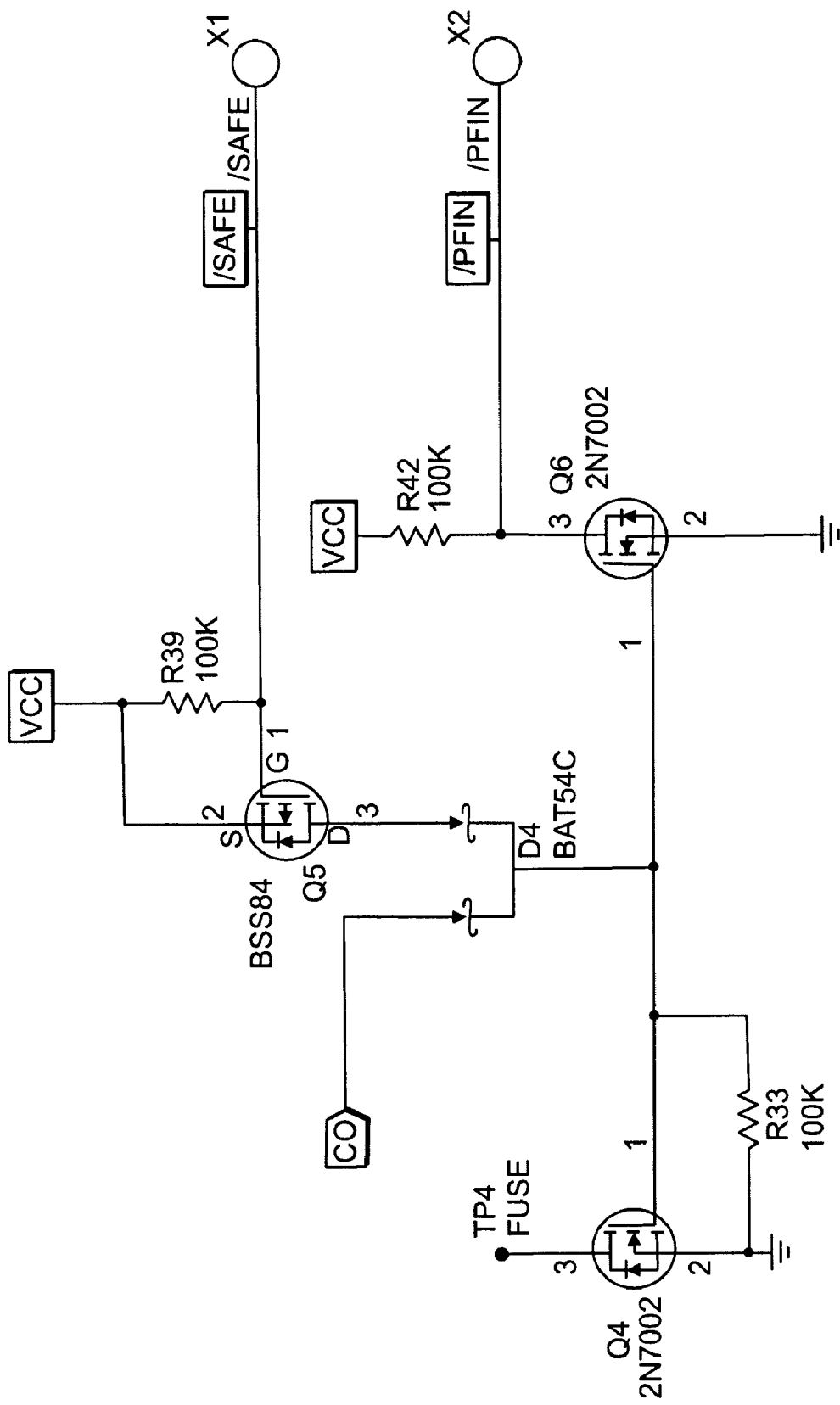
Figure 8C:
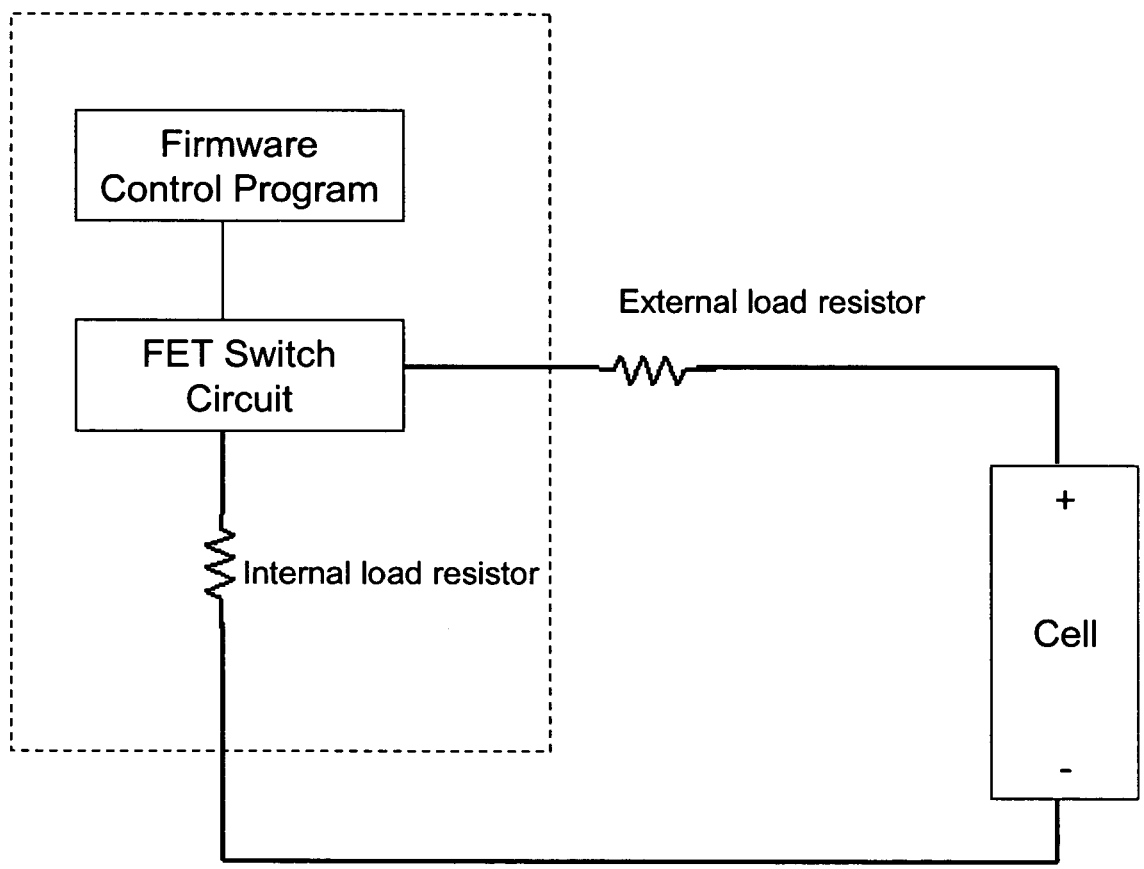
FIG. 8C is a block diagram of a cell balancing circuit with firmware that can be used for an electronic circuit for controlling a storage voltage of a battery pack in the invention.

Examples of electronic circuits diagrams suitable for use in conjunction with the invention are shown in FIGS. 8A-8C. FIG. 8A shows an example of a suitable battery charging/discharging controlling chipset from Texas instruments (bq29312), with interacting charging/discharging FETs that are controlled by a microprocessor (available from ti.com). In the Texas instruments' chipset, the bq29312 (circled in FIG. 8A) is a 2-, 3- or 4-cell lithium-ion battery pack protection analog front end (AFE) IC that incorporates a 3.3.-V, 25-mA low-dropout regulator (DO). The bq29312 also integrates an I2C compatible interface to extract battery parameters (e.g., cell voltages and control output status). Current protection thresholds and delays can also be programmed into the bq29312. The circuitry has compatible users interface that also allows access to battery information. Chosen predetermined levels of the voltage and time parameters from the invention would be programmed into the microprocessor that in turn would control turning the FETs off and on depending on the voltage and time response of each individual cell or cell block.

FIG. 8B shows a reference design of a chipset supporting cell balancing from Texas instruments (available from ti.com). The discharge resistors are circled in FIG. 8B. Under the invention, the microprocessor would be programmed to discharge cells that are within the predetermined voltage and time levels through the highlighted external discharge resistors.

FIG. 8C shows a simplified functional block diagram of a chipset known in the art. The firmware control program would read and control time and voltage levels according to the invention. Cells are eligible would be discharged through load resistors.

In the designs of FIGS. 8A-8C, the FETs are inside the chip. In order to enable higher currents for discharge, FETs can optionally be moved outside the chipset. This provides easier means to manage heat as high current cause heating.

In one embodiment, battery pack 14 includes at least one lithium-ion cell. In this embodiment, preferably, the predetermined range(s) of voltage for triggering a discharge mechanism is between about 3.85 V and about 3.95 V, or between about 4.15 V and about 4.20 V, and the predetermined voltage is about 4.20 V. In a specific embodiment, two predetermined ranges of voltage are employed for each triggering the discharge mechanism, i.e., ranges of between about 3.85 V and about 3.95 V, and between about 4.15 V and about 4.20 V. In a more specific embodiment, in addition to the two predetermined ranges, the predetermined voltage is also employed for each triggering the discharge mechanism.

In a preferred embodiment, battery pack 14 includes at least one lithium-ion cell having the full state-of-charge of 4.2 V.

Cells or batteries for battery pack 14 can be cylindrical or prismatic (stacked or wound), preferably prismatic, and more preferably of a prismatic shape that is oblong. Although the present invention can use all types of prismatic cells or batteries, oblong shape is preferred.

Referring back to FIG. 2, in some embodiments of the invention, battery pack 14 include a plurality of lithium-ion batteries (or cells) (e.g., 2 to 5 cells) which are connected with each other in series. Alternatively, battery pack 14 can include a plurality of lithium-ion batteries (or cells) which are connected with each other in parallel or in series and parallel.

The present invention also includes a battery pack including control electronics 16, such as battery pack 14 as described above. A control electronic device that includes a device housing and control electronics 16, as described above, for example, control electronic device 70, is also encompassed by the invention.

Suitable positive active materials for the positive electrodes of the lithium-ion batteries (or cells) include any material known in the art, for example, lithium nickelate (e.g., $LiNiM'O_2$), lithium cobaltate (e.g., $LiCoO_2$), olivine-type compounds (e.g., $LiFePO_4$), manganate spinel (e.g., $Li_{1+x}Mn_{2-x}O_4$ or $Li_{(1+x1)}(Mn_{1-y1}A'_{y2})_{2-x2}O_{z1}$) and combinations thereof. Various examples of suitable positive active materials can be found in international application No. PCT/US2005/047383, and a U.S. patent application entitled "Lithium-ion Secondary Battery," filed on Jun. 23, 2006, the entire teachings of which are incorporated herein by reference.

In one embodiment, each lithium-ion cell included in battery pack 14 includes an active cathode mixture that includes a manganate spinel. In a preferred embodiment, the manganate spinel is represented by an empirical formula of

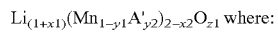
$Li_{(1+x1)}(Mn_{1-y1}A'_{y2})_{2-x2}O_{z1}$ where:

x1 and x2 are each independently equal to or greater than 0.01 and equal to or less than 0.3;

y1 and y2 are each independently equal to or greater than 0.0 and equal to or less than 0.3;

z1 is equal to or greater than 3.9 and equal to or less than 4.1; and

A' is at least one member of the group consisting of magnesium, aluminum, cobalt, nickel and chromium.

In one specifically preferred embodiment, the manganate spinel is represented by an empirical formula of $Li_{(1+x1)}(Mn_{1-y1}A'_{y2})_{2-x2}O_{z1}$ where A' includes a $M^{3+}$ ion, such as $Al^{3+}$, $Co^{3+}$, $Ni^{3+}$ and $Cr^{3+}$, more preferably $Al^{3+}$. In another specific embodiment, the manganate spinel is represented by an empirical formula of $Li_{(1+x1)}(Mn_{1-y1}A'_{y2})_{2-x2}O_{z1}$ where y2 is zero. More preferably, the manganate spinel for the invention includes a compound represented by an empirical formula of $Li_{(1+x1)}Mn_2O_{z1}$, where x1 and z1 are each independently the same as described above. Alternatively, the manganate spinel for the invention includes a compound represented by an empirical formula of $Li_{(1+x1)}Mn_{2-x2}O_{z1}$, where x1, x2 and z1 are each independently the same as described above.

Specific examples of the manganate spinel that can be used in the invention include $LiMn_{1.9}Al_{0.1}O_4$, $Li_{1+x1}Mn_2O_4$, $Li_{1+x1}Mn_{2-x2}O_4$, and their variations with Al and Mg modifiers. Various other examples of manganate spinel compounds of the type $Li_{(1+x1)}(Mn_{1-y1}A'_{y2})_{2-x2}O_{z1}$ can be found in U.S. Pat. Nos. 4,366,215; 5,196,270; and 5,316,877 (the entire teachings of which are incorporated herein by reference).

In another embodiment, each lithium-ion cell included in battery pack 14 includes an active cathode mixture that includes a manganate spinel and a lithium cobaltate. Suitable examples of the manganate spinel are as described above.

Suitable examples of lithium cobaltates that can be used in the invention include $LiCoO_2$ that is modified by at least one of modifiers of Li and Co atoms. Examples of the Li modifiers include barium (Ba), magnesium (Mg) and calcium (Ca). Examples of the Co modifiers include the modifiers for Li and aluminum (Al), manganese (Mn) and boron (B). Other examples include nickel (Ni) and titanium (Ti). Particularly, lithium cobaltates represented by an empirical formula of $Li_{x6}M'_{(1-y6)}Co_{(1-z6)}M''_{z6}O_2$, where x6 is greater than 0.05 and less than 1.2; y6 is equal to or greater than 0 and less than 0.1, z6 is equal to or greater than 0 and less than 0.5; M' is at least one member of magnesium (Mg) and sodium (Na) and M'' is at least one member of the group consisting of manganese (Mn), aluminum (Al), boron (B), titanium (Ti), magnesium (Mg), calcium (Ca) and strontium (Sr), can be used in the invention. Another example of lithium cobaltates that can be used in the invention includes $LiCoO_2$.

In a specific embodiment, the lithium cobaltate and the manganate spinel for the invention are in a weight ratio of lithium cobaltate: manganate spinel between about 0.95:0.05 to about 0.55:0.45, preferably between about 0.9:0.1 to about 0.6:0.4, more preferably between about 0.8:0.2 to about 0.6:0.4, even more preferably between about 0.75:0.25 to about 0.65:0.45, such as about 0.7:0.3.

In a more specific embodiment, the lithium cobaltate is $LiCoO_2$ doped with Mg and/or coated with a refractive oxide or phosphate, such as $ZrO_2$ or $Al_2(PO_4)_3$. In another more specific embodiment, the lithium cobaltate is $LiCoO_2$ with no modifiers.

In a even more specific embodiment, each lithium-ion cell included in battery pack 14 includes an active cathode mixture that includes $Li_{(1+x1)}Mn_2O_{z1}$, preferably $Li_{1+x1}Mn_2O_4$, and $LiCoO_2$. In another even more specific embodiment, each lithium-ion cell included in battery pack 14 includes an active cathode mixture that includes $Li_{1+x1}Mn_{2-x2}O_{z1}$, preferably, $Li_{1+x1}Mn_{2-x2}O_4$, and $LiCoO_2$.

Suitable examples of electronic device 12 for the invention include, but not limited to, portable power devices, such as portable computers, power tools, toys, portable phones, camcorders, PDAs and HEVs (Hybrid Electric Vehicles). Preferably, in one embodiment where an HEV is employed, the midpoint voltage selected for battery pack 14 avoids the predetermined range of voltage described above, such as between about 3.85 V and about 3.95 V. The midpoint voltage in HEV applications is chosen based on the battery packs ability to deliver both high discharge power, as well as the ability to take high charging power during regenerative breaking. The mid point is typically chosen to be at about 50-60% state-of-charge. This state-of-charge setting then corresponds to a certain voltage, which depends on the chemistry in the battery. In a specific embodiment, a voltage lower than about 3.85 V is selected for the midpoint voltage of operation. In another specific embodiment, a voltage higher than about 3.95 V is selected for the midpoint voltage of operation.

The lithium-ion cells (or batteries) for the invention can be prepared by a suitable method known in the art. Typically, the lithium-ion cells (or batteries) include positive electrode, negative electrodes and electrolytes in a cell casing. Such positive and negative electrodes, and electrolytes can be formed by suitable methods known in the art.

For example, a positive electrode can be produced by mixing the active positive materials described above (e.g., $Li_{1+x1}Mn_2O_4$ and $LiCoO_2$) at a specific ratio. 90 wt % of this blend is then mixed together with 5 wt % of acetylene black as a conductive agent, and 5 wt % of PVDF as a binder. The mix is dispersed in N-methyl-2-pyrrolidone (NMP) as a solvent, in order to prepare slurry. This slurry is then applied to both surfaces of an aluminum current collector foil, having a typical thickness of about 20 um, and dried at about 100-150° C. The dried electrode is then calendared by a roll press, to obtain a compressed positive electrode.

A negative electrode can be prepared, for example, by mixing 93 Wt % of graphite as a negative active material, 3 wt % acetylene black, and 4 wt % of PVDF as a binder. The negative mix was also dispersed in N-methyl-2-pyrrolidone as a solvent, in order to prepare the slurry. The negative mix slurry was uniformly applied on both surfaces of a strip-like copper negative current collector foil, having a typical thickness of about 10 um. The dried electrode is then calendared by a roll press to obtain a dense negative electrode.

The negative and positive electrodes and a separator formed of a polyethylene film with micro pores, of thickness 25 um, are generally laminated and spirally wound to produce a spiral type electrode element.

Examples of suitable negative active materials for the negative electrodes include any material allowing lithium to be doped or undoped in or from the material. Examples of such materials include carbonaceous materials, for example, non-graphitic carbon, artificial carbon, artificial graphite, natural graphite, pyrolytic carbons, cokes such as pitch coke, needle coke, petroleum coke, graphite, vitreous carbons, or a heat treated organic polymer compound obtained by carbonizing phenol resins, furan resins, or similar, carbon fibers, and activated carbon. Further, metallic lithium, lithium alloys, and an alloy or compound thereof are usable as the negative active materials. In particular, the metal element or semiconductor element allowed to form an alloy or compound with lithium may be a group IV metal element or semiconductor element, such as but not limited to, silicon or tin. In particular amorphous tin, that is doped with a transition metal, such as cobalt or iron/nickel, is a metal that has high promise for anode material in these type batteries. Oxides allowing lithium to be doped or undoped in or out from the oxide at a relatively basic potential, such as iron oxide, ruthenium oxide, molybdenum oxide, tungsten oxide, titanium oxide, and tin oxide, and nitrides can be similarly usable as the negative active materials.

Examples of suitable non-aqueous electrolytes include a non-aqueous electrolytic solution prepared by dissolving an electrolyte salt in a non-aqueous solvent, a solid electrolyte (inorganic electrolyte or polymer electrolyte containing an electrolyte salt), and a solid or gel-like electrolyte prepared by mixing or dissolving an electrolyte in a polymer compound or the like.

The non-aqueous electrolytic solution is typically prepared by dissolving a salt in an organic solvent. The organic solvent can include any suitable type that has been generally used for batteries of this type. Examples of such organic solvents include propylene carbonate, ethylene carbonate, diethyl carbonate, dimethyl carbonate, 1,2-dimethoxyethane, 1,2-diethoxyethane, γ-butyrolactone, tetrahydrofuran, 2-methyl tetrahydrofuran, 1,3-dioxolane, 4-methyl-1,3-dioxolane, diethyl ether, sulfolane, methylsulfolane, acetonitrile, propionitrile, anisole, acetate, butyrate, propionate and the like. It is preferred to use cyclic carbonates such as propylene carbonate, or chain carbonates such as dimethyl carbonate and diethyl carbonate. These organic solvents can be used singly or in a combination of two types or more.

Additives or stabilizers may also be present in the electrolyte, such as VC (vinyl carbonate), VEC (vinyl ethylene carbonate), EA (ethylene acetate), TPP (triphenylphosphate), phosphazenes, biphenyl (BP), lithium bis(oxalato)borate (LiBoB), ethylene sulfate (ES) and propylene sulfate. These additives are used as anode and cathode stabilizers or flame retardants, which may make a battery have higher performance in terms of formation, cycle efficiency, safety and life.

The solid electrolyte can include an inorganic electrolyte, a polymer electrolyte and the like insofar as the material has lithium-ion conductivity. The inorganic electrolyte can include, for example, lithium nitride, lithium iodide and the like. The polymer electrolyte is composed of an electrolyte salt and a polymer compound in which the electrolyte salt is dissolved. Examples of the polymer compounds used for the polymer electrolyte include ether-based polymers such as polyethylene oxide and cross-linked polyethylene oxide, polymethacrylate ester-based polymers, acrylate-based polymers and the like. These polymers may be used singly, or in the form of a mixture or a copolymer of two kinds or more.

A matrix of the gel electrolyte may be any polymer insofar as the polymer is gelated by absorbing the above-described non-aqueous electrolytic solution. Examples of the polymers used for the gel electrolyte include fluorocarbon polymers such as polyvinylidene fluoride (PVDF), polyvinylidene-co-hexafluoropropylene (PVDF-HFP) and the like.

Examples of the polymers used for the gel electrolyte also include polyacrylonitrile and a copolymer of polyacrylonitrile. Examples of monomers (vinyl based monomers) used for copolymerization include vinyl acetate, methyl methacrylate, butyl methacylate, methyl acrylate, butyl acrylate, itaconic acid, hydrogenated methyl acrylate, hydrogenated ethyl acrylate, acrlyamide, vinyl chloride, vinylidene fluoride, and vinylidene chloride. Examples of the polymers used for the gel electrolyte further include acrylonitrile-butadiene copolymer rubber, acrylonitrile-butadiene-styrene copolymer resin, acrylonitrile-chlorinated polyethylene-propylene-diene-styrene copolymer resin, acrylonitrile-vinyl chloride copolymer resin, acrylonitrile-methacylate resin, and acrlylonitrile-acrylate copolymer resin.

Examples of the polymers used for the gel electrolyte include ether based polymers such as polyethylene oxide, copolymer of polyethylene oxide, and cross-linked polyethylene oxide. Examples of monomers used for copolymerization include polypropylene oxide, methyl methacrylate, butyl methacylate, methyl acrylate, butyl acrylate.

In particular, from the viewpoint of oxidation-reduction stability, a fluorocarbon polymer can be preferably used for the matrix of the gel electrolyte.

The electrolyte salt used in the electrolyte may be any electrolyte salt suitable for batteries of this type. Examples of the electrolyte salts include $LiClO_4$, $LiAsF_6$, $LiPF_6$, $LiBF_4$, $LiB(C_6H_5)_4$, $LiB(C_2O_4)_2$, $CH_3SO_3Li$, $CF_3SO_3Li$, $LiCl$, $LiBr$ and the like. Generally, a separator separates the positive electrode from the negative electrode of the batteries. The separator can include any film-like material having been generally used for forming separators of non-aqueous electrolyte secondary batteries of this type, for example, a microporous polymer film made from polypropylene, polyethylene, or a layered combination of the two. In addition, if a solid electrolyte or gel electrolyte is used as the electrolyte of the battery, the separator does not necessarily need to be provided. A microporous separator made of glass fiber or cellulose material can in certain cases also be used. Separator thickness is typically between 9 and 25 μm.

The electrolyte is then vacuum filled in the cell casing of a lithium-ion battery where the cell casing has the spirally wound "jelly roll". One or more positive lead strips, made of, e.g., aluminum, are attached to the positive current electrode, and then electrically connected to the positive terminal of the batteries. A negative lead, made of, e.g., nickel metal, connects the negative electrode, and then attached to the negative terminal, for example, via a feed-through device known in the art.

EXEMPLIFICATION

Example

Stability and Capacity of Li-ion Cells Stored at Various Voltages

In this example, it is shown that for Li-ion batteries, in particular for Li-ion batteries containing a mixture of a lithium cobaltate and a manganate spinel, the voltage level of a given cell is a determining factor for the calendar life of the cell. This example shows that there is a particular voltage range where Li-ion cells degrade faster. It is therefore desired, in order to enhance calendar life in batteries to as much as possible avoid this voltage range during use or storage of a battery having these characteristics. In particular, it has been found that for batteries containing a mixture having spinel in the cathode and a graphite anode, a storage voltage range between approximately 3.85V and 3.95V is detrimental to calendar life. In addition, the voltage range between 4.15V and 4.20V is also found to have increased degradation. This is believed to be due to very low rate chemical reactions that dissolve metal ions from the cathode structure, in particular for cathodes that contain manganese oxides of spinel structure. Upon this dissolution the structural integrity of the electrode is gradually destroyed and capacity is degraded.

Test Procedures

Cells were prepared by methods known in the art, for example, by methods disclosed in PCT/US2005/047383 and a U.S. patent application entitled "Lithium-ion Secondary Battery," filed on June 23,the entire teachings all of which are incorporated herein by reference. A mixture of $LiCoO_2$ (70 wt %) and $Li_{1+x1}MnO_4$ (30 wt %) was used as an active cathode materials for these cells. The cells were stored for two weeks at 60° C. at various voltages, representing a selection of states-of-charge in the cell. 60° C. was selected as the higher temperature would expedite faster degradation than room temperature measurements. The cells were then fully discharged to test for remaining capacity in the cell. In order to check for recoverable capacity, the cells were then recharged to full state-of-charge (4.2V) and discharged again to test for recoverable capacity of the cells.

In addition to capacity of the cells, the relative change of thickness increase also was measured in the cells, as this is believed to be a measure of amount gassing due to irrecoverable loss of lithium from the cathode electrode and would relate to voltage stability.

TABLE 1

Thickness increase, retained and recovered capacity for cells stored at 60° C. for two weeks

| | Storage voltage (V) | | | | |
|---|---|---|---|---|---|
| | 4.2 | 4.1 | 4.0 | 3.9 | 3.8 |
| Retained Capacity | 86.37% | 88.48% | 88.11% | 79.08% | 76.33% |
| Recovered Capacity | 94.89% | 95.03% | 94.80% | 90.92% | 94.60% |
| Thickness increase | 0.64% | 0.51% | 0.51% | 1.08% | 0.75% |

Table 1 summarizes the observed values for these measurements. As shown in Table 1 above, the retained capacity was found to be at maximum between approximately 3.95V and 4.15V. At voltage higher than 4.1V, the retained capacity was lowered and at voltages lower than 3.9V, the capacity was significantly lowered.

The relative thickness increase of the cells followed the trend of the recoverable capacity with the higher thickness increase at voltages above 4.1V and voltages below 3.9V. This may be at least partly due to both gassing type reactions as well as regular expansion/contraction of the electrode due to the change crystal lattice parameter of the active materials as lithium is moving in and out of the crystal structures. This expansion/contraction action causes permanent increase of electrode thickness resulting in a net expansion of the cell thickness. It is therefore reasonable to assume that limited increased gassing is occurring between two ranges, of about 4.15-4.2V and about 3.85-3.95V. It is likely so that chemical and physical features at the interface between the electrode materials and the electrolyte allows for enhanced reactivity, and therefore also for lowering of retained and recoverable capacity in the voltage ranges specified. The lowering of retained capacity comes from permanent loss of lithium to reaction products on the interfaces and gas, while the recoverable capacity loss is from self-discharging mechanism, which is not producing a net loss of lithium in the active materials. Another result of this increased reactivity at the interfaces for certain voltage ranges is enhanced gassing, which gradually builds up pressure inside the cells. The recovered capacity was lower for the measurement at 3.9V, leading to a conclusion that the voltage range of about 3.85V to about 3.95V is particularly bad for the calendar life.

Equivalents

While this invention has been particularly shown and described with references to preferred embodiments thereof, it will be understood by those skilled in the art that various changes in form and details may be made therein without departing from the scope of the invention encompassed by the appended claims.

What is claimed is:

1. A method of controlling a storage voltage of a battery pack with control electronics for an electronic device, comprising the steps of:
    a) sensing a storage voltage of the battery pack wherein the battery pack includes at least one lithium-ion cell having a cathode that includes an active cathode mixture, wherein the cathode mixture includes a manganate spinel represented by an empirical formula of $Li_{(1+x1)}(Mn_{1-y1}A'_{y2})_{2-x2}O_{z1}$ where:

x1 and x2 each independently are equal to or greater than 0.01 and equal to or less than 0.3;
    y1 and y2 each independently are equal to or greater than 0.0 and equal to or less than 0.3;
    z1 is equal to or greater than 3.9 and equal to or less than 4.1; and
    A' is at least one member of the group consisting of magnesium, aluminum, cobalt, nickel and chromium;
    b) sensing a time period for which the electronic device is not interacting with a user;
    c) determining: i) if the time period is longer than a predetermined time value, ii) whether the storage voltage is within a predetermined range of voltage at any time during that time period, and iii) whether the storage voltage is at or above a predetermined voltage at any time during that time period; and
    d) triggering a discharge mechanism if,
        i) the time period is longer than the predetermined time value, and the storage voltage is within the predetermined range of voltage at any time during that time period, to thereby adjust the storage voltage of the battery pack to below the predetermined range of voltage; or
        ii) the time period is longer than the predetermined time value, and the storage voltage is at or above the predetermined voltage at any time during that time period, to thereby adjust the storage voltage of the battery pack to below the predetermined voltage.

2. The method of claim 1, wherein the predetermined time value is about 1 hour.

3. The method of claim 2, wherein the predetermined time value is about 2 hours.

4. The method of claim 3, wherein the predetermined time value is about 1 hour.

5. The method of claim 1, wherein the predetermined storage voltage is a voltage of a full state-of-charge.

6. The method of claim 5, wherein the predetermined time value is about 2 hours.

7. The method of claim 1, wherein the cathode further includes at least one member selected from the group consisting of lithium nickelate, lithium cobaltate and a lithium containing olivine compound.

8. The method of claim 1, wherein the cathode mixture further includes lithium cobaltate.

9. The method of claim 8, wherein the lithium cobaltate and the manganate spinel are in a ratio of lithium cobaltate: manganate spinel between about 0.95:0.05 and about 0.5 5:0.45 by weight.

10. The control electronic device of claim 9, wherein the predetermined range of voltage is selected from the group consisting of between about 3.85 V and about 3.95 V, and between about 4.15 V and about 4.20 V, and wherein the predetermined voltage is about 4.20 V.

11. A system, comprising:
    a) an electronic device;
    b) a battery pack that includes at least one lithium-ion cell having a cathode that includes an active cathode mixture, wherein the cathode mixture includes a manganate spinel represented by an empirical formula of $Li_{(1+x1)}(Mn_{1-y1}A'_{y2})_{2-x2}O_{z1}$ where:

x1 and x2 each independently are equal to or greater than 0.01 and equal to or less than 0.3;
    y1 and y2 each independently are equal to or greater than 0.0 and equal to or less than 0.3;
    z1 is equal to or greater than 3.9 and equal to or less than 4.1; and
    A' is at least one member of the group consisting of magnesium, aluminum, cobalt, nickel and chromium;
    c) control electronics coupled to the electronic device and the battery pack, the control electronics:
        i) sensing a storage voltage of the battery pack;
        ii) sensing a time period for which the electronic device is not interacting with a user;
        iii) determining: 1) the time period is longer than a predetermined time value, 2) whether the storage voltage is within a predetermined range of voltage at any time during that time period, and 3) whether the storage voltage is at or above a predetermined voltage at any time during that time period, whereby the discharge mechanism is triggered; and
        iv) triggering a discharge mechanism if,
            1) the time period is longer than the predetermined time value, and the storage voltage is within the predetermined range of voltage at any time during that time period, to thereby adjust the storage voltage of the battery pack to below the predetermined range of voltage; or
            2) the time period is longer than the predetermined time value, and the storage voltage is at or above the predetermined voltage at any time during that time period, to thereby adjust the storage voltage of the battery pack to below the predetermined voltage.

12. The system of claim 11, wherein the control electronics includes
    a) a detector circuit to sense a voltage of the battery pack and time; and
    b) a controller circuit to control a voltage and a current of the battery pack.

13. The system of claim 12, wherein the control electronics are implemented into the battery pack.

14. The system of claim 12, wherein the control electronics are implemented into the electronic device.

15. The system of claim 12, wherein one of the detector circuit and the controller circuit is implemented into the battery pack, and one of the detector circuit and the controller circuit is implemented into the electronic device.

16. The system of claim 11, wherein the battery pack includes a resistive load through which the storage voltage of the battery pack is discharged.

17. The system of claim 11, wherein the predetermined time value is about 1 hour.

18. The system of claim 11, wherein the predetermined storage voltage is a voltage of a full state-of-charge.

19. The system of claim 18, wherein the predetermined time value is about 1 hour.

20. The system of claim 11, further including a charging circuit to charge the battery pack from an external power source, wherein the charging circuit is coupled to the control electronics.

21. The system of claim 20, wherein the charging circuit is in the battery pack.

22. The system of claim 11, wherein the cathode further includes at least one member selected from the group consisting of lithium nickelate, lithium cobaltate and a lithium containing olivine compound.

23. The system of claim 11, wherein the cathode mixture further includes lithium cobaltate.

24. The system of claim 23, wherein the lithium cobaltate and the manganate spinel are in a ratio of lithium cobaltate: manganate spinel between about 0.95:0.05 and about 0.55:0.45 by weight.

25. The system of claim 24, wherein the predetermined range of voltage is selected from the group consisting of between about 3.85 V and about 3.95 V, and between about 4.15 V and about 4.20 V, and wherein the predetermined voltage is about 4.20 V.

26. A battery pack comprising:
   a) a pack housing;
   b) at least one cell in the pack housing wherein at least one of said cells is a lithium-ion cell having a cathode that includes an active cathode mixture, wherein the cathode mixture includes a manganate spinel represented by an empirical formula of

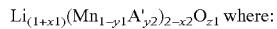 where:

x1 and x2 each independently are equal to or greater than 0.01 and equal to or less than 0.3;
   y1 and y2 each independently are equal to or greater than 0.0 and equal to or less than 0.3;
   z1 is equal to or greater than 3.9 and equal to or less than 4.1; and
   A' is at least one member of the group consisting of magnesium, aluminum, cobalt, nickel and chromium;
   c) control electronics in the pack housing, the control electronics:
   i) sensing a storage voltage of the battery pack;
   ii) sensing a time period for which the electronic device is not interacting with a user;
   iii) determining: 1) if the time period is longer than a predetermined time value, 2) whether the storage voltage is within a predetermined range of voltage at any time during that time period, and 3) whether the storage voltage is at or above a predetermined voltage at any time during that time period, whereby the discharge mechanism is triggered; and
   iv) triggering a discharge mechanism if,
      1) the time period is longer than the predetermined time value, and the storage voltage is within the predetermined range of voltage at any time during that time period, to thereby adjust the storage voltage of the battery pack to below the predetermined range of voltage; or
      2) the time period is longer than the predetermined time value, and the storage voltage is at or above the predetermined voltage at any time during that time period, to thereby adjust the storage voltage of the battery pack to below the predetermined voltage.

27. The battery pack of claim 26, wherein the control electronics includes
   a) a detector circuit to sense a voltage of the battery pack and time; and
   b) a controller circuit to control a voltage and a current of the battery pack.

28. The battery pack of claim 26, further including a charging circuit to charge the battery pack from an external power source, wherein the charging circuit is coupled to the control electronics.

29. The battery pack of claim 26, wherein the cathode further includes at least one member selected from the group consisting of lithium nickelate, lithium cobaltate and a lithium containing olivine compound.

30. The battery pack of claim 26, wherein the cathode mixture further includes lithium cobaltate.

31. The battery pack of claim 30, wherein the lithium cobaltate and the manganate spinel are in a ratio of lithium cobaltate: manganate spinel between about 0.95:0.05 and about 0.55:0.45 by weight.

32. The battery pack of claim 31, wherein the predetermined range of voltage is selected from the group consisting of between about 3.85 V and about 3.95 V, and between about 4.15 V and about 4.20 V, and wherein the predetermined voltage is about 4.20 V.

33. A control electronic device, comprising:
   a) a device housing;
   b) control electronics in the device housing, the control electronics:
   i) sensing a storage voltage of a lithium-ion cell having a cathode that includes an active cathode mixture, wherein the cathode mixture includes a manganate spinel represented by an empirical formula of

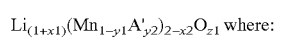 where:

x1 and x2 each independently are equal to or greater than 0.01 and equal to or less than 0.3;
   y1 and y2 each independently are equal to or greater than 0.0 and equal to or less than 0.3;
   z1 is equal to or greater than 3.9 and equal to or less than 4.1; and
   A' is at least one member of the group consisting of magnesium, aluminum, cobalt, nickel and chromium;
   ii) sensing a time period for which the electronic device is not interacting with a user;
   iii) determining: 1) if the time period is longer than a predetermined time value, 2) whether the storage voltage is within a predetermined range of voltage at any time during that time period, and 3) whether the storage voltage is at or above a predetermined voltage at any time during that time period, whereby the discharge mechanism is triggered; and
   iv) triggering a discharge mechanism if,
      1) the time period is longer than the predetermined time value, and the storage voltage is within the predetermined range of voltage at any time during that time period, to thereby adjust the storage voltage of the battery pack to below the predetermined range of voltage; or
      2) the time period is longer than a predetermined time value, and the storage voltage is at or above the predetermined voltage at any time during that time period, to thereby adjust the storage voltage of the battery pack to below the predetermined voltage.

34. The control electronic device of claim 33, wherein the cathode further includes at least one member selected from the group consisting of lithium nickelate, lithium cobaltate and a lithium-containing olivine compound.

35. The control electronic device of claim 33, wherein the cathode mixture further includes lithium cobaltate.

36. The control electronic device of claim 35, wherein the lithium cobaltate and the manganate spinel are in a ratio of lithium cobaltate: manganate spinel between about 0.95:0.05 and about 0.55:0.45 by weight.

37. The control electronic device of claim 36, wherein the predetermined range of voltage is selected from the group consisting of between about 3.85 V and about 3.95 V, and between about 4.15 V and about 4.20 V, and wherein the predetermined voltage is about 4.20 V.

* * * * *